United States Patent
Kataoka et al.

(10) Patent No.: US 9,672,855 B2
(45) Date of Patent: Jun. 6, 2017

(54) PERPENDICULAR MAGNETIC RECORDING MEDIUM

(71) Applicant: FUJI ELECTRIC CO., LTD., Kawasaki-shi (JP)

(72) Inventors: Hiroyasu Kataoka, Sendai (JP); Hiroto Kikuchi, Sendai (JP); Akira Furuta, Sendai (JP); Shinji Uchida, Matsumoto (JP); Takehito Shimatsu, Natori (JP)

(73) Assignee: FUJI ELECTRIC CO., LTD., Kawasaki-Shi (JP)

( * ) Notice: Subject to any disclaimer, the term of this patent is extended or adjusted under 35 U.S.C. 154(b) by 0 days.

(21) Appl. No.: 14/560,708

(22) Filed: Dec. 4, 2014

(65) Prior Publication Data

US 2015/0132608 A1    May 14, 2015

Related U.S. Application Data

(63) Continuation of application No. PCT/JP2013/007213, filed on Dec. 6, 2013.

(30) Foreign Application Priority Data

Dec. 6, 2012   (JP) ................. 2012-267588

(51) Int. Cl.
  *G11B 5/66*  (2006.01)
  *G11B 5/65*  (2006.01)
(52) U.S. Cl.
  CPC .............. *G11B 5/66* (2013.01); *G11B 5/65* (2013.01); *G11B 5/653* (2013.01)
(58) Field of Classification Search
  None
  See application file for complete search history.

(56) References Cited

U.S. PATENT DOCUMENTS 5,652,054 A   7/1997  Kikitsu et al.
7,521,137 B2  4/2009  Hohlfeld et al.
(Continued)

FOREIGN PATENT DOCUMENTS

JP   H08-83418 A    3/1996
JP   2001-351217 A  12/2001
(Continued)

OTHER PUBLICATIONS

Alagarsamy Perumal et al., "$L1_0$ FePt-C Nanogranular Perpendicular Anisotropy Films with Narrow Size Distribution", Applied Physics Express 1, No. 10, Sep. 26, 2008, pp. 101301-1-101301-3.
(Continued)

*Primary Examiner* — Kevin Bernatz
(74) *Attorney, Agent, or Firm* — Rabin & Berdo, P.C.

(57) ABSTRACT

A perpendicular magnetic recording medium includes at least a nonmagnetic substrate and a magnetic recording layer. The magnetic recording layer is constituted by a plurality of layers that includes at least a first magnetic recording layer and a second magnetic recording layer. The first magnetic recording layer has a granular structure that includes first magnetic crystal grains and first nonmagnetic crystal grain boundaries surrounding the first magnetic crystal grains. The first magnetic crystal grains include an ordered alloy, and the first nonmagnetic crystal grain boundaries are constituted by carbon. The second magnetic recording layer has a granular structure that includes second magnetic crystal grains and a second nonmagnetic crystal grain boundaries that surround the second magnetic crystal grains. The second magnetic crystal grains include an ordered alloy, and the second nonmagnetic crystal grain boundaries are constituted by a carbon-containing nonmagnetic material.

10 Claims, 13 Drawing Sheets

(56) References Cited

U.S. PATENT DOCUMENTS

| | | | |
|---|---|---|---|
| 8,530,065 B1* | 9/2013 | Chernyshov | G11B 5/65 428/829 |
| 2006/0222902 A1* | 10/2006 | Mukai | G11B 5/66 428/827 |
| 2009/0310864 A1 | 12/2009 | Takagi et al. | |
| 2010/0189886 A1 | 7/2010 | Peng | |
| 2010/0200124 A1* | 8/2010 | Qiu | B32B 15/018 148/527 |
| 2012/0052330 A1* | 3/2012 | Takekuma | G11B 5/84 428/829 |
| 2012/0196154 A1 | 8/2012 | Uchida | |
| 2012/0225325 A1* | 9/2012 | Nemoto | G11B 5/65 428/829 |
| 2012/0300600 A1 | 11/2012 | Kanbe et al. | |
| 2013/0004796 A1* | 1/2013 | Peng | G11B 5/66 428/827 |
| 2013/0170075 A1* | 7/2013 | Dai | G11B 5/65 360/244 |
| 2013/0264306 A1* | 10/2013 | Bian | G11B 5/65 216/22 |
| 2014/0377590 A1* | 12/2014 | Uchida | G11B 5/65 428/829 |
| 2015/0004437 A1* | 1/2015 | Moriya | G11B 5/66 428/827 |
| 2015/0138939 A1* | 5/2015 | Hellwig | G11B 5/66 369/13.41 |

FOREIGN PATENT DOCUMENTS

| | | |
|---|---|---|
| JP | 2006-190485 A | 7/2006 |
| JP | 2007-026558 A | 2/2007 |
| JP | 2008-009782 A | 1/2008 |
| JP | 2008-091024 A | 4/2008 |
| JP | 2008-097824 A | 4/2008 |
| JP | 2010-102816 A | 5/2010 |
| JP | 2010-153030 A | 7/2010 |
| JP | 2010-176829 A | 8/2010 |
| JP | 2011-154746 A | 8/2011 |
| JP | 2012-048784 A | 3/2012 |
| JP | 2012-160242 A | 8/2012 |
| JP | 2012-181902 A | 9/2012 |

OTHER PUBLICATIONS

Yuki Inaba et al., "New High Density Recording Technology: Energy Assisted Recording Media", Fuji Electric Journal, vol. 83, No. 4, 2010, p. 257-260.

R. F. Penoyer, "Automatic Torque Balance for Magnetic Anisotropy Measurements", The Review of Scientific Instruments, vol. 30, No. 8, Aug. 1959, p. 711-714.

Kyojiseitai-no Butsuri (part 2), Chikazumi Soushin, Shokabo, p. 10-21.

* cited by examiner

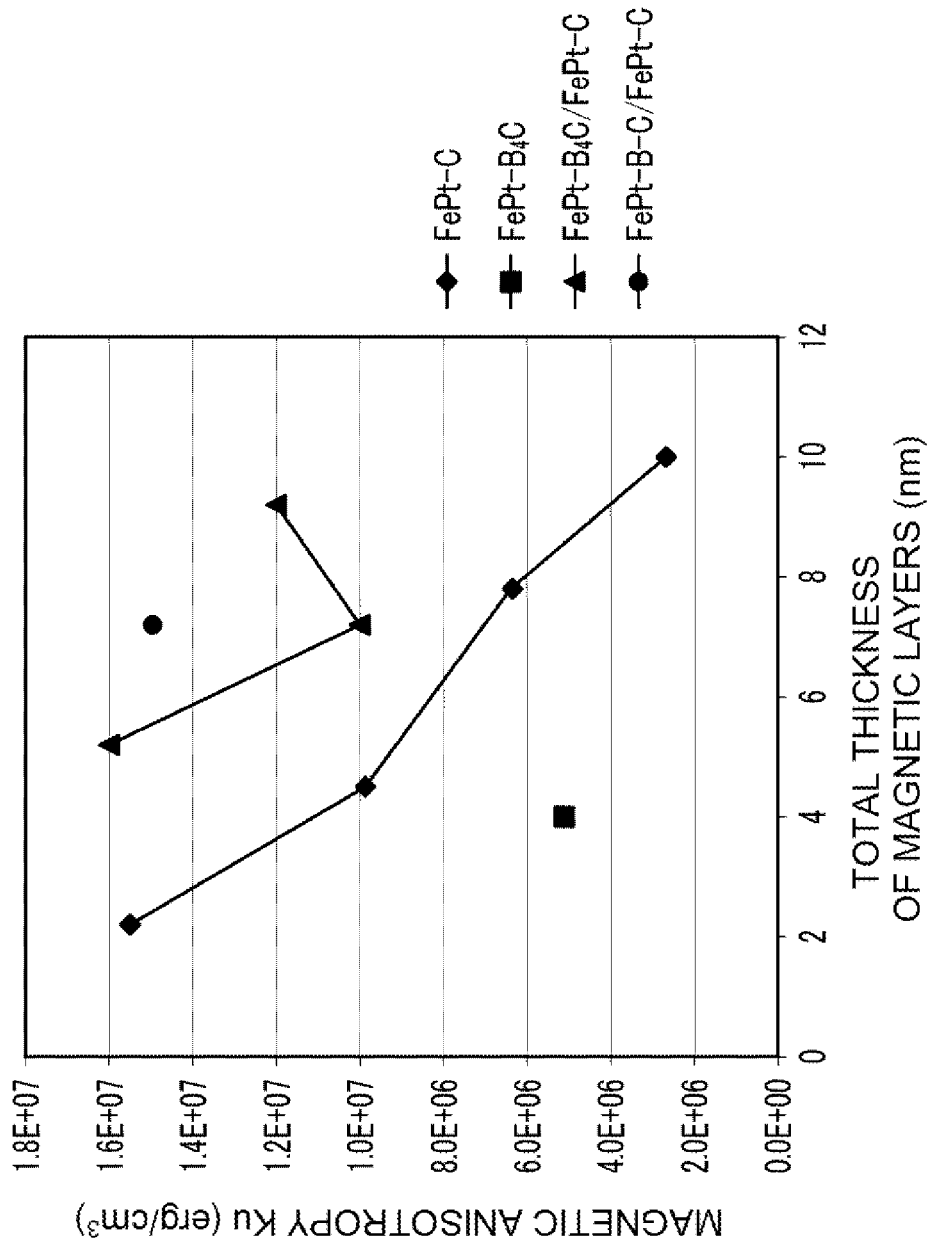

PLANAR TEM IMAGE OF COMPARATIVE EXAMPLE 9

40nm

PERPENDICULAR MAGNETIC RECORDING MEDIUM

CROSS-REFERENCE TO RELATED APPLICATIONS

This application is a continuation of international application PCT/JP2013/007213, filed on Dec. 6, 2013 and designating the United States. Furthermore, this application claims the benefit of a foreign priority of Japanese application 2012-267588, filed on Dec. 6, 2012. The disclosures of these earlier applications are incorporated herein by reference.

TECHNICAL FIELD

The present invention relates to a perpendicular magnetic recording medium. In particular, the present invention relates to a perpendicular magnetic recording medium including a granular magnetic layer, in which the magnetic layer is increased in thickness, while a high magnetic anisotropy is maintained.

BACKGROUND ART

In recent years, a strong demand has been created for increased density of magnetic recording. A perpendicular magnetic recording method has been used as a technique for realizing high-density magnetic recording. A perpendicular magnetic recording medium based on such a method includes at least a nonmagnetic substrate and a magnetic recording layer including a hard magnetic material. In addition to the abovementioned components, a perpendicular magnetic recording medium may further optionally include a soft magnetic underlayer that is formed from a soft magnetic material and serves to concentrate the magnetic flux generated by a magnetic head in the magnetic recording layer, an underlayer for orienting the hard magnetic material of the magnetic recording layer in the target direction, and a protective layer that protects the surface of the magnetic recording layer.

A granular magnetic material can be used for forming the magnetic recording layer of the perpendicular magnetic recording medium. The granular magnetic material is constituted by a magnetic material and a nonmagnetic material and has a granular structure constituted by magnetic crystal grains and a nonmagnetic material that has precipitated such as to surround the periphery of the magnetic crystal grains. In recent years, for example, ordered alloys have attracted attention as the magnetic materials, and carbon based, oxide base, and nitride based materials are known as the nonmagnetic material (see, for example, Patent Literature 1).

Various materials have been suggested as granular magnetic materials for perpendicular magnetic recording media, but where the thickness of the magnetic recording layer increases, the phenomenon of the nonmagnetic material precipitating not only on the grain boundaries of magnetic crystal grains, but also on the surface of magnetic crystal grains, and inhibiting the growth of magnetic crystal grains can occur, depending on the combination of an ordered alloy as magnetic crystal grains and a nonmagnetic material (see Non-Patent Literature 1). Where the thickness of the magnetic recording layer is further increased after such precipitation on the surface has occurred, the so-called secondary growth occurs in which the magnetic crystal grains grow on the nonmagnetic material that has precipitated on the surface of magnetic crystal grains. Such secondary growth results in the decreased magnetic anisotropy of the perpendicular magnetic recording medium.

Accordingly, various nonmagnetic materials have been studied for inclusion in granular magnetic materials. For example, Patent Literature 2 discloses a perpendicular magnetic recording medium including a magnetic recording layer using $B_4C$ as a nonmagnetic material. Patent Literature 2 reports that high thermal stability and a high magnetic anisotropy constant (Ku) can be realized and that the film is grown by a DC sputtering method. However, Patent Literature 2 does not mention using $B_4C$ in combination with an ordered alloy.

Patent Literature 3 discloses a heat-assisted magnetic recording medium having a magnetic layer of a two-layer structure in which a granular magnetic material, in which an oxide such as $SiO_2$ is added as a nonmagnetic material to an ordered alloy having a $L1_0$-type crystal structure, is used for the first magnetic layer, and a continuous layer (CAP layer) including no such oxide is used as the second magnetic layer. The specific feature of the invention disclosed in Patent Literature 3 is that the content ratio of the nonmagnetic material in the first magnetic layer decreases from the substrate side toward the second magnetic layer, and because of such a configuration, the excess nonmagnetic material is prevented from precipitating on top of crystal grains of the ordered alloy and the growth of crystal grains is prevented from splitting in the perpendicular direction. As a result, fine crystal grains of the ordered alloy that has grown continuously in the direction perpendicular to the substrate surface are realized.

A magnetic recording medium constituted by a plurality of magnetic layers including a granular magnetic material, in which the concentration of a nonmagnetic material differs between the magnetic layers, is also known.

For example, Patent Literature 4 discloses a method for manufacturing a perpendicular magnetic recording medium including a step for forming a substrate temperature controlling layer on a substrate, a step for forming an underlayer on the substrate temperature controlling layer, and a step for forming a magnetic recording layer on the underlayer, wherein in the step for forming a magnetic recording layer, a magnetic layer stacking step, which includes a first step for heating the substrate in a heating chamber and a second step for producing, in a film production chamber, a magnetic recording layer constituted by an alloy based on FePt additionally containing at least one nonmagnetic material selected from the group including C and Si oxide, is repeated N times (N≥2 times). With such manufacturing method, variations in the substrate temperature during the production of the magnetic recording layer are reduced and a crystal grain size is decreased. Further, in Patent Literature 4, the amount of the nonmagnetic material added to the magnetic recording layer is larger on the substrate side.

Patent Literature 5 discloses a magnetic recording medium having a magnetic recording layer constituted by a plurality of magnetic layers including a magnetic alloy containing Fe and Pt as the main starting materials and at least one nonmagnetic material selected from carbon, oxides, and nitrides. In the magnetic recording layer disclosed in Patent Literature 5, the second magnetic layer positioned of the surface side with respect to the first magnetic layer has a homogeneous structure constituted by a mixture of crystal grains that are finer than the FePt magnetic alloy grains of the first magnetic layer (the layer constituted by the FePt alloy and the nonmagnetic material). Further, in Patent Literature 5, the first magnetic layer is characterized in that the content of carbon, which is a nonmagnetic material, is greater and the content of oxides and nitrides, which constitute other components, is less than those in the second magnetic layer.

Patent Literature 1: Japanese Patent Application Publication No. H8-083418

Patent Literature 2: Japanese Patent Application Publication No. 2008-097824

Patent Literature 3: Japanese Patent Application Publication No. 2011-154746

Patent Literature 4: Japanese Patent Application Publication No. 2012-048784

Patent Literature 5: Japanese Patent Application Publication No. 2012-181902

Non-Patent Literature 1: Appl. Phys. Express, 101301, 2008

Non-Patent Literature 2: Fuji Jiho, vol. 83, No. 4, 2010, p. 257-260

Non-Patent Literature 3: R. F. Penoyer, Rev. Sci. Instr. 30 (1959), p. 711

Non-Patent Literature 4: Kyojiseitai-no Butsuri (part 2), Chikazumi Soushin, Shokabo, p. 10-21

In a perpendicular magnetic recording medium, a high magnetic anisotropy should be maintained. Further, in a perpendicular magnetic recording medium, it is desirable, that the grains of the ordered alloy in the granular structure be refined (see Patent Literature 3). Furthermore, magnetic recording media for energy-assisted recording, such as heat-assisted and microwave-assisted recording, has recently attracted attention as the magnetic recording media with increased recording density (see Non-Patent Literature 2). According to the research conducted by the inventors, it is preferred that a magnetic recording layer in a magnetic recording medium for energy-assisted recording have a certain thickness. Thus, a magnetic recording layer for a perpendicular magnetic recording medium is required to include a fine-grain ordered alloy and have a predetermined thickness while maintaining a high magnetic anisotropy.

However, with the ordered alloy-nonmagnetic material combinations that have been conventionally used, a sufficient thickness cannot be realized with a monolayer configuration. Further, even among the magnetic recording media including a plurality of magnetic recording layers constituted by a granular magnetic material, a magnetic recording medium in which a predetermined film thickness is realized while maintaining a sufficiently high magnetic anisotropy could not be heretofore obtained.

DISCLOSURE OF THE INVENTION

Therefore, it is an objective of the present invention to provide a perpendicular magnetic recording medium including a magnetic recording layer having the desired thickness while maintaining a high magnetic anisotropy.

The magnetic recording medium in accordance with the present invention includes at least a nonmagnetic substrate and a magnetic recording layer. In the perpendicular magnetic recording medium, the magnetic recording layer is constituted by a plurality of layers including at least a first magnetic recording layer and a second magnetic recording layer;

the first magnetic recording layer has a granular structure including first magnetic crystal grains and a first nonmagnetic crystal grain boundary surrounding the first magnetic crystal grains, the first magnetic crystal grains including an ordered alloy, and the first nonmagnetic crystal grain boundary being constituted by carbon; and the second magnetic recording layer has a granular structure including second magnetic crystal grains and a second nonmagnetic crystal grain boundary surrounding the second magnetic crystal grains, the second magnetic crystal grains including an ordered alloy, and the second nonmagnetic crystal grain boundary being constituted by two or more materials selected from carbon, boron or silicon.

The perpendicular magnetic recording medium in accordance with the present invention includes at least a nonmagnetic substrate and a magnetic recording layer. In the perpendicular magnetic recording medium, the magnetic recording layer is constituted by a plurality of layers including at least a first magnetic recording layer and a second magnetic recording layer;

the first magnetic recording layer has a granular structure including first magnetic crystal grains and a first nonmagnetic crystal grain boundary surrounding the first magnetic crystal grains, the first magnetic crystal grains including an ordered alloy, and the first nonmagnetic crystal grain boundary being constituted by carbon; and the second magnetic recording layer has a granular structure including second magnetic crystal grains and a second nonmagnetic crystal grain boundary surrounding the second magnetic crystal grains, the second magnetic crystal grains including an ordered alloy, and the second nonmagnetic crystal grain boundary being a carbide.

In accordance with the present invention, the carbide is preferably a borocarbide (B-carbide) or a silicocarbide (Si-carbide), more particularly boron carbide ($B_4C$) or silicon carbide (SiC). Further, in accordance with the present invention, the second nonmagnetic crystal grain boundary is preferably two or more materials selected from carbon, boron or silicon. In accordance with the present invention, it is preferred that the content of the carbide or two or more materials selected from carbon, boron or silicon, be from 20 vol % to 50 vol %.

Further, in accordance with the present invention, it is preferred that the first magnetic crystal grains and the second magnetic crystal grains include an $L1_0$-type ordered alloy, and it is particularly preferred that the $L1_0$-type ordered alloy include Fe and Pt. The thickness of the first magnetic recording layer is preferably equal to or less than 4 nm.

Further, the magnetic recording medium in accordance with the present invention may have a plurality of the first magnetic recording layers or the second magnetic recording layers, and the first magnetic recording layers and the second magnetic recording layers may be stacked alternately.

It is possible to obtain a perpendicular magnetic recording medium including magnetic recording layers having the predetermined thickness, while maintaining a high magnetic anisotropy.

BRIEF DESCRIPTION OF THE DRAWINGS

FIG. 3(a) is a cross-sectional view showing magnetic crystal grains deposited by sputtering FePt—C material onto a seed layer, and also showing a nonmagnetic crystal grain boundary around grains;

FIG. 3(b) is a cross-sectional view corresponding to FIG. 3(a) when further FePt—C material is deposited; and FIG. 3(c) is a cross-sectional view corresponding to FIG. 3(c) when still more FePt—C material is deposited and secondary growth magnetic crystal grains are formed;

FIG. 4(a) is a cross-sectional view showing magnetic crystal grains formed by depositing FePt—$B_4C$ onto a seed layer; and FIG. 4(b) is a cross-sectional view corresponding to FIG. 4(a), but in which a slight nonmagnetic grain boundary and a mixed state layer are formed;

FIG. 5 shows the measurement result relating to the magnetic anisotropy constant (Ku) of the magnetic recording media of Examples 1 to 3, Example 11, and Comparative Examples 1 to 5;

EMBODIMENTS FOR CARRYING OUT THE INVENTION

Figure 1:
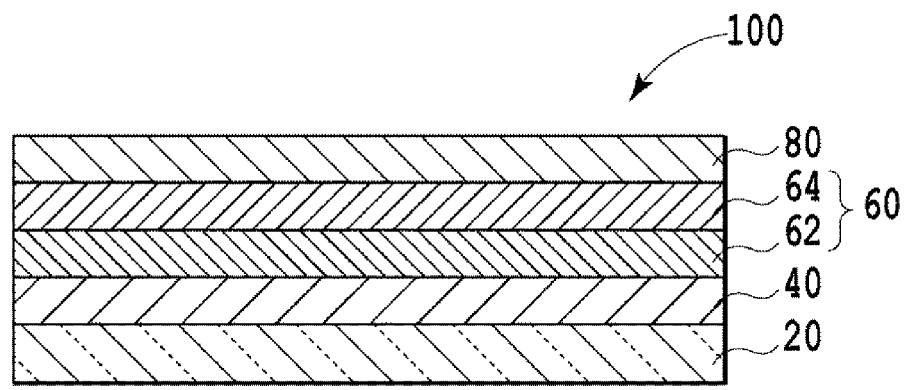
FIG. 1 is a schematic cross-sectional view of an embodiment of the perpendicular magnetic recording medium in accordance with the present invention.

The magnetic recording medium in accordance with the present invention includes at least a nonmagnetic substrate and a magnetic recording layer. FIG. 1 shows a specific configuration example of the magnetic recording medium in accordance with the present invention. As shown in FIG. 1, a magnetic recording medium 100 in accordance with the present invention has a nonmagnetic substrate 20, an optional seed layer 40, a magnetic recording layer 60, and an optional protective layer 80. In the present invention, the magnetic recording layer 60 is constitute by a plurality of layers including at least a first magnetic recording layer 62 and a second magnetic recording layer 64. FIG. 1 shows a two-layer structure including the first magnetic recording layer 62 and the second magnetic recording layer 64. Further, the first magnetic recording layer is constituted by first magnetic crystal grains and first nonmagnetic crystal grain boundaries surrounding the first magnetic crystal grains, and the second magnetic recording layer is constituted by second magnetic crystal grains and second nonmagnetic crystal grain boundaries surrounding the second magnetic crystal grains. In the configuration example of the magnetic recording medium in accordance with the present invention shown in FIG. 1, the seed layer 40 and the protective layer 80 are optional layers, as mentioned hereinabove, but in accordance with the present invention, it is preferred that those layers be provided. The magnetic recording medium in accordance with the present invention may further include an adhesive layer, a soft magnetic underlayer, and a nonmagnetic underlayer between the nonmagnetic substrate 10 and the magnetic recording layer 60. Lubricating layer may be further provided on top of the protective layer 80.

The magnetic recording medium in accordance with the present invention can be used in a variety of perpendicular magnetic recording media including media for energy-assisted magnetic recording, such as heat-assisted and microwave-assisted magnetic recording. Therefore, in addition to the abovementioned layers, the magnetic recording medium in accordance with the present invention can include, as appropriate, layers necessary for various perpendicular magnetic recording media. For example, in the perpendicular magnetic recording medium of a heat assist system, a head sink layer or the like can be further included below the magnetic recording layer.

In accordance with the present invention, as mentioned hereinabove, the magnetic recording layer 60 is constituted by a plurality of layers including at least the first magnetic recording layer 62 and the second magnetic recording layer 64. In the explanation below, the present invention has such a configuration of the magnetic recording layer.

In the contemporary perpendicular magnetic recording medium, a magnetic recording layer is typically configured of a magnetic crystal grains-nonmagnetic material combination which provides a granular structure constituted by magnetic crystal grains of an ordered alloy and a nonmagnetic crystal grain boundary surrounding the magnetic crystal grains, and such magnetic crystal grains-nonmagnetic material combinations have been extensively studied. For example, $L1_0$-type ordered alloys, and alloys of an iron-platinum (FePt) system and cobalt-platinum (CoPt) system are known. For example, FePt-carbon (C) (referred to hereinbelow as FePt—C), and FePt—$SiO_2$ are known as $L1_0$-type ordered alloy-nonmagnetic material combinations including such ordered alloys. Those materials are expected to demonstrate a high magnetic anisotropy, but the research conducted by the inventors demonstrated that a problem of the so-called secondary growth of magnetic crystal grains and a problem of impossibility of forming the granular structure on a specific seed layer are associated with such materials.

It is an objective of the present invention to resolve such problems and to provide a perpendicular magnetic recording medium for which a predetermined film thickness can be realized while maintaining a high magnetic anisotropy and which can be sufficiently used with a variety of systems including energy-assisted magnetic recording systems.

The abovementioned problems and the essence of the invention of the present application will be described hereinbelow with reference to the appended drawings by considering FePt—C and FePt—$B_4C$ as examples of the $L1_0$-type ordered alloy-nonmagnetic material combination.

Figure 2:
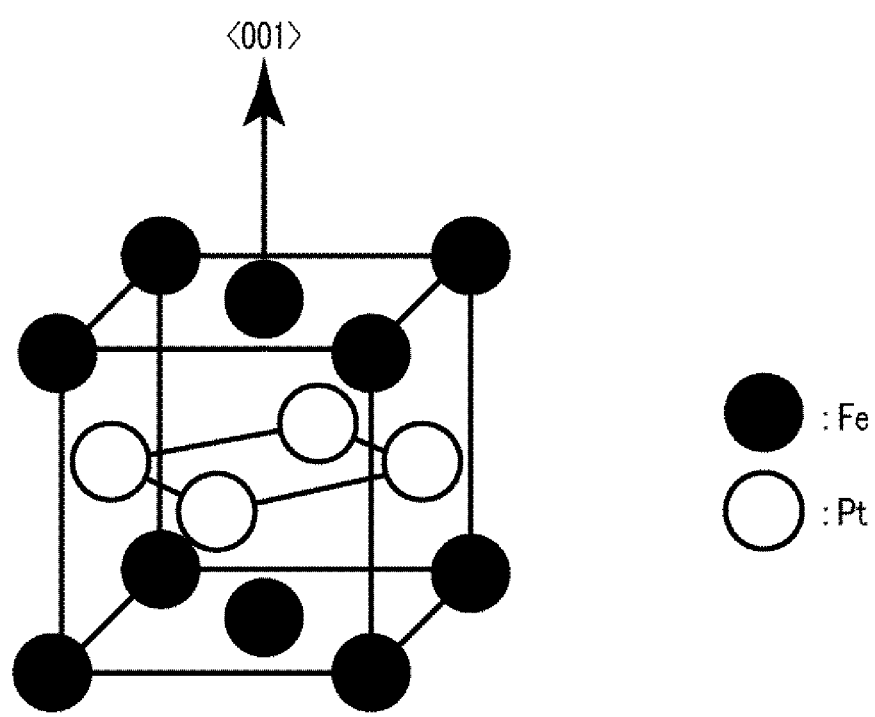
FIG. 2 is a schematic diagram representing the crystal structure of the $L1_0$-type ordered alloy that can be used in accordance with the present invention.

FIG. 2 shows the crystal lattice of the $L1_0$-type FePt alloy. As shown in FIG. 2, the $L1_0$-type FePt alloy has a structure with a (001) orientation in which Fe atoms and Pt atoms are alternately stacked.

Figure 3A:
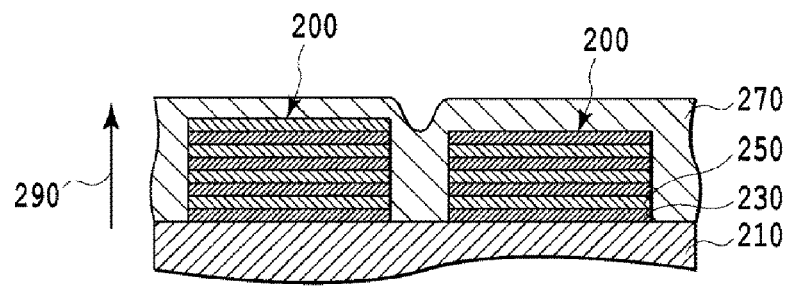
FIGS. 3(a) to 3(c) are schematic diagrams for explaining the problems encountered in the process of growing the granular magnetic material (FePt—C) of a magnetic recording layer, and more specifically.
Figure 3B:
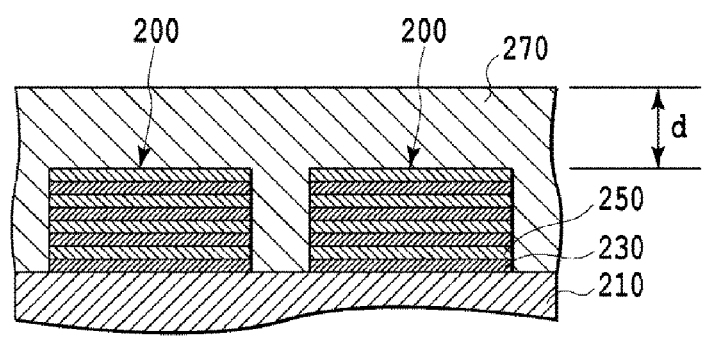
Figure 3C:
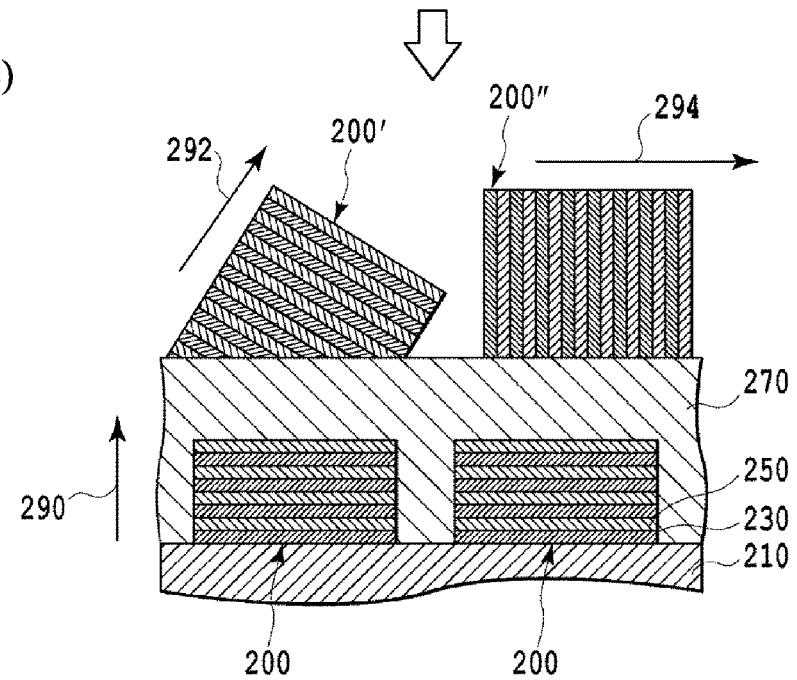

FIGS. 3(a)-3(c) show a growth process in which the $L1_0$-type FePt—C material is deposited on a seed layer 210 by sputtering. In this example, the seed layer is a MgO layer that enables the formation of $L1_0$-type FePt magnetic crystal grains having the (001) orientation. As shown in FIG. 3(a), where the FePt—C material is deposited by sputtering, magnetic crystal grains 200 and a nonmagnetic crystal grain boundary 270 surrounding the magnetic crystal grains grow on the seed layer 210. The magnetic crystal grains 200 have a structure in which layers 230 of Fe atoms and layers 250 of Pt atoms are stacked alternately, as shown in FIG. 2, and the crystals grow in the direction perpendicular to the seed layer 210. As a result, a magnetic recording layer having magnetic anisotropy that can have an axis 290 of easy magnetization perpendicular to the seed layer 210 can be obtained. FIG. 3(a) shows an example in which the layer 230 of Fe atoms is stacked on the seed layer 210, and the layer 250 of Pt atoms is stacked thereupon. However, in another possible configuration, the layer 250 of Pt atoms is stacked on the seed layer 210, and the layer 230 of Fe atoms is present thereon. Further, where FePt—C is further deposited to make the film thicker, carbon wraps around the surface of magnetic crystal grains, carbon is deposited on the surface of magnetic crystal grains ((d) in FIG. 3(b)), and the growth of magnetic crystal grains 200 is inhibited (FIG. 3(b)). Furthermore, where FePt—C is further deposited, magnetic crystal grains 200', 200" grow on the carbon that has wrapped around the surface of magnetic crystal grains, and the so-called secondary growth of magnetic crystal grains is started. The secondary grown magnetic crystal grains 200', 200" grow in the direction different from that of the magnetic crystal grains 200, which have grown in the direction perpendicular to the seed layer 210, and have the axis of easy magnetization (292, 294) different from that of the magnetic crystal grains 200 (FIG. 3(c)). Where the crystals grow in such different directions, the magnetic anisotropy of the entire magnetic recording layer decreases. The inventors have discovered that in the FePt—C, for example, when a 75 vol % FePt-25 vol % C material is used, the aforementioned wrapping of carbon around the surface of magnetic crystal grains starts when the height of magnetic crystal grains from the seed layer exceeds 3 nm. Further, it is clarified that the film thickness at which the carbon wraparound occurs changes depending on the size of magnetic crystal grains, and the carbon wraparound occurs at a smaller film thickness as the grain size decreases. Thus, where the amount of carbon added is increased to decrease the magnetic crystal grains in order to increase the recording density, the film thickness at which good magnetic crystal grains can be formed decreases. Therefore, it is found that the film thickness is difficult to increase, while maintaining a high magnetic anisotropy, in a FePt—C monolayer.

Thus, with a material using an ordered alloy such as FePt—C, a magnetic recording layer is difficult to increase in thickness with a monolayer configuration. Magnetic recording layers using ordered alloys demonstrate the behavior different from that of magnetic recording layers using disordered alloys such as CoCr based alloys that have been conventionally used.

Figure 4A:
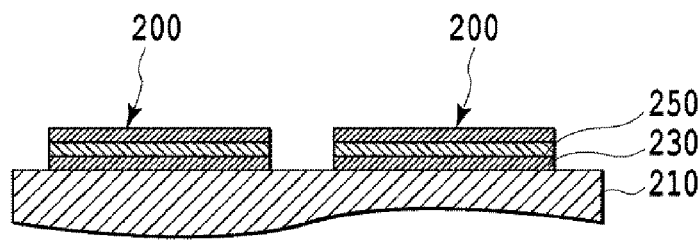
FIGS. 4(a) and 4(b) are schematic diagrams for explaining the problems encountered in the process of growing the granular magnetic material (FePt—$B_4C$) of a magnetic recording layer, and more specifically.
Figure 4B:
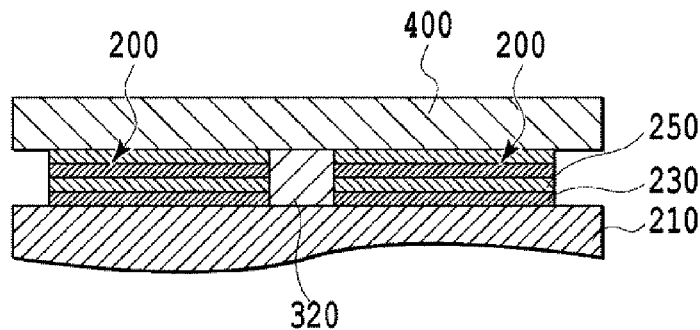

Meanwhile, magnetic recording media in which granular structure is formed of a magnetic material including $B_4C$ as a nonmagnetic material are known (Patent Literature 2). However, the magnetic recording medium that has actually been fabricated in this cited literature does not use an ordered alloy. The research conducted by the inventors demonstrates that, for example, with FePt—$B_4C$, where the seed layer 210 using MgO or the like as a constituting material is used, as shown in FIGS. 4(a) and 4(b), FePt magnetic crystal grains 200 are formed, as shown in FIG. 4(a), but a nonmagnetic grain boundary 320 surrounding the magnetic crystal grains is not formed or a slight nonmagnetic grain boundary is formed (FIG. 4(b)), the magnetic crystal grains are not separated from each other, and a mixed state (400) is assumed. While not wishing to be bound by theory, this is apparently because $B_4C$, which is a nonmagnetic material, is hardly released from the FePt magnetic crystal grains and remains inside the grains even though the FePt magnetic crystal grains grow. Where the nonmagnetic material thus remains inside the magnetic crystal grains, $B_4C$ also grows inside the magnetic crystal grains, following the deposition of FePt—$B_4C$, which gradually leads to the fracture of magnetic crystal grains. This fracture decreases the magnetic anisotropy. Thus, the research conducted by the inventors has demonstrated that the film thickness may not always be increased also with a monolayer configuration of the FePt—$B_4C$ material.

Further, SiC is also known as a nonmagnetic grain boundary precipitating material, but the research conducted by the inventors demonstrates that an ordered alloy-SiC combination also cannot form a sufficient granular structure with a monolayer configuration, similarly to the abovementioned FePt—$B_4C$ system.

Thus, among the materials constituted by an ordered alloy and a nonmagnetic material, those obtained by adding a carbide based nonmagnetic material have heretofore had limited application as magnetic materials for magnetic recording layers of perpendicular magnetic recording media. In particular, a concept of using such a material as an ordered alloy-nonmagnetic material combination for realizing the increased film thickness in a perpendicular magnetic recording medium has not been suggested. Further, a magnetic recording layer for a perpendicular magnetic recording medium of a sufficient thickness has not been heretofore realized by using a material constituted by an ordered alloy-carbon combination in which carbon is added as the nonmagnetic material.

The inventors have discovered in the present invention that where an $L1_0$-type ordered alloy-carbon (C) (FePt—C) combination is formed in advance as a template layer on a seed layer, an $L1_0$-type ordered metal-carbide or ordered metal-[carbon and one or more materials selected from boron and/or silicon] (in the present description, a carbide, a borocarbide (B-carbide) or a silicocarbide (Si-carbide), boron carbide ($B_4C$) or silicon carbide (SiC), and carbon and one or more materials selected from boron and/or silicon is also simply referred to as carbon-containing nonmagnetic material) can grow on the $L1_0$-type ordered alloy-carbon (C) while forming a granular structure, and a magnetic recording layer of a desired film thickness can be formed. It has also been established that a perpendicular magnetic recording medium including such a magnetic recording layer has a high magnetic anisotropy.

The present invention is based on the abovementioned findings and makes it possible to realize thickness increase in a magnetic recording layer while maintaining a high magnetic anisotropy with a magnetic recording layer having a granular structure.

Constituent elements of the magnetic recording medium in accordance with the present invention are explained below.

The nonmagnetic substrate 20 may be a substrate of various types with a smooth surface. For example, the nonmagnetic substrate 20 can be formed using a material that is generally used for a magnetic recording medium. For example, a material such as a NiP-plated Al alloy, strengthened glass, and crystallized glass can be used as the nonmagnetic substrate. When a glass substrate, or the like, is used as the nonmagnetic substrate, an alloy material with excellent adhesivity, for example, Cr, CrTi, and Ta, may be formed as an adhesive layer on the substrate.

The optional soft magnetic underlayer has a function of concentrating the magnetic flux generated by the magnetic head in the magnetic recording layer during recording on the magnetic recording layer. The soft magnetic underlayer can be formed using a crystalline material such as FeTaC and Sendust (FeSiAl) alloy, or an amorphous materials including Co alloys such as CoZrNb, CoTaZr, and CoFeZrTa. In this case, the material needs to be selected such that the surface roughness thereof is not changed by crystallization at the magnetic layer formation temperature.

The optimum value of the thickness of the soft magnetic underlayer changes depending on structure and properties of the magnetic head used for recording, but from the standpoint of balance with productivity, a value of about 10 nm (inclusive) to 500 nm (inclusive) is preferred.

The objective of providing the optional nonmagnetic underlayer is to ensure adhesion between the soft magnetic underlayer and the seed layer 40 and to obtain the desired orientation of the seed layer 40. The nonmagnetic underlayer can be formed using Cr or an alloy including Cr. The nonmagnetic underlayer may have a stacked structure configured of a plurality of layers constituted by NiW, Ta, Cr, or alloys including Ta and/or Cr. From the standpoint of increasing the crystallinity of the below-described seed layer 40 and magnetic recording layer 60, raising productivity, and optimizing the magnetic field generated by the head during recording, it is preferred that the nonmagnetic underlayer have a thickness of 5 nm (inclusive) to 30 nm (inclusive).

The function of the seed layer 40 is to control the crystal orientation of the magnetic crystal grains of the magnetic recording layer 60 which is the upper layer. It is also desirable that the seed layer 40 be nonmagnetic.

More specifically, the seed layer 40 serves to impart, for example, a (001) orientation to the crystals of the ordered alloy in the magnetic recording layer 60 (for example, in the case of an $L1_0$-type FePt alloy). Such an orientation enables perpendicular magnetic recording.

In order to realize the abovementioned function, the material for the seed layer 40 is selected, as appropriate, according to the material of the magnetic crystal grains of the magnetic recording layer 60. For example, when the magnetic crystal grains of the magnetic recording layer 60 are formed from an $L1_0$-type ordered alloy, materials with a cubic crystal system are preferred, $SrTiO_3$, MgO, TiN, CrN and the like are especially preferred, and MgO is most preferred. In accordance with the present invention, the seed layer 40 can be also formed using a mixture of the abovementioned oxides. The seed layer 40 can be also formed by stacking a plurality of layers constituted by the abovementioned materials. From the standpoint of increasing the crystallinity of the magnetic crystal grains of the magnetic recording layer 60 and raising productivity, it is desirable that the seed layer 40 have a thickness of 1 nm to 60 nm, preferably 1 nm to 20 nm. The seed layer 40 can be formed using any method known in the pertinent field, such as sputtering (including DC magnetron sputtering and RF sputtering) and vacuum vapor deposition. In accordance with the present invention, it is particularly preferred that the seed layer 40 be formed using MgO.

The magnetic recording layer 60 includes at least two layers, namely, the first magnetic recording layer 62 and the second magnetic recording layer 64. The first magnetic recording layer 62 has a granular structure including first magnetic crystal grains and a first nonmagnetic crystal grain boundary surrounding the first magnetic crystal grains, and the second magnetic layer has a granular structure including second magnetic crystal grains and a second nonmagnetic crystal grain boundary surrounding the second magnetic crystal grains. In the present invention, the second magnetic recording layer is characterized in having a granular structure in which the nonmagnetic crystal grain boundary is constituted by a material different that of the first nonmagnetic crystal grain boundary of the first magnetic recording layer.

In accordance with the present invention, the first magnetic recording layer 62 has a granular structure constituted by first magnetic crystal grains including an ordered alloy and a first nonmagnetic crystal grain boundary constituted by carbon. The second magnetic recording layer 64 has a granular structure constituted by second magnetic crystal grains including an ordered alloy and a second nonmagnetic crystal grain boundary constituted by a carbide, or by carbon and one or more materials selected from boron and silicon. In the present invention, the first nonmagnetic crystal grain boundary is constituted by carbon (C). The second nonmagnetic crystal grain boundary is preferably constituted by a carbide, or by carbon and one or more materials selected from boron and silicon, more preferably by $B_4C$, SiC, TiC, ZrC, and boron-carbon (B—C), and most preferably by $B_4C$, SiC, or B—C. In the present description, "boron-carbon" or "B—C" means that the nonmagnetic material of the second magnetic recording layer is constitute by boron and carbon, but means to include not only the form including a clear bond of boron (B) and carbon (C), such as boron carbide, but also a form in which boron (B) and carbon (C) are present as a mixture. In the present description, such B—C nonmagnetic material including a plurality of forms is represented simply as "boron-carbon" or "B—C".

In the present invention the ratio of the nonmagnetic material in the magnetic crystal grains-nonmagnetic material combination is preferably 20 vol % to 50 vol %, more preferably 20 vol % to 40 vol %, as represented by carbon in the magnetic crystal grains-carbon combination. The amount of the carbon-containing nonmagnetic material in the ordered alloy-carbon-containing nonmagnetic material combination is preferably 20 vol % to 50 vol %, more preferably 20 vol % to 40 vol %, and even more preferably 20 vol % to 30 vol %. The abovementioned ranges are preferred to increase the total thickness of the magnetic recording layer.

In the present invention, when the nonmagnetic material of the second nonmagnetic crystal grain boundary is a material constituted by boron and carbon, the [B (at %)/C (at %) ratio] ratio based on at % of boron (B) and carbon (C) in the second magnetic recording layer is preferably equal to or greater than 0.3, more preferably equal to or greater than 0.4.

The first magnetic crystal grains and second magnetic crystal grains of the first and second magnetic recording layers include an ordered alloy, preferably an $L1_0$-type ordered alloy. In particular, an $L1_0$-type ordered ally including at least one element selected from Fe, Co, and Ni, and at least one element selected from Pt, Pd, Au, Cu, and Ir is preferred. It is more preferred that the ordered alloy be an $L1_0$-type alloy constituted by a material selected from the group including FePt, CoPt, FePd, and CoPd, and an $L1_0$-type FePt alloy is most preferred.

With the object of modulating the properties of the magnetic crystal grains, a metal such as Ni, Mn, Cr, Cu, Ag, and Au may be added to the first and second magnetic crystal grains. By adding Ni, Mn, and Cr, it is possible to reduce magnetic interaction and change magnetic properties such as magnetic anisotropy and Curie temperature. Therefore, the desired magnetic properties can be obtained. Where Cu, Ag, or Au is added, the effect of reducing the ordering temperature and increasing the magnetic anisotropy can be obtained.

For example, where Mn is added to the second magnetic recording layer, an inverted magnetic field (Hsw) can be reduced due to the decreased Curie temperature, and heat-assisted recording is facilitated. Thus, where Mn is added to the magnetic crystal grains and a combination with the carbon-containing nonmagnetic material is used, the dependence of the inverted magnetic field on temperature changes significantly in the vicinity of Curie temperature, and the inverted magnetic field becomes equal to or lower than the recording magnetic field generated by the magnetic head. As a result, heat-assisted recording can be performed at a temperature greatly lower than the conventional temperature. Further, the temperature gradient of the inverted magnetic field increases in this temperature range and the resolution of recording during heat-assisted recording can be improved.

It is not necessary that all of the atoms in the magnetic crystal grains have an ordered structure. An ordering degree S representing the degree of ordered structure may be equal to or higher than a predetermined value. The ordering degree S can be calculated by measuring the magnetic recording medium with X-ray diffraction (XRD) and calculating from a ratio of the measured value and a theoretical value relating to perfect ordering. For example, in the case of an $L1_0$-type ordered alloy, initially, the integral intensity of (001) and (002) peaks derived from the ordered alloy is calculated. Then, the value (IN1) of the ratio of the measured integral intensity of the (001) peak to the measured integral intensity of the (002) peak and the value (IN2) of the ratio of the integral intensity of the (001) peak to the integral intensity of the (002), those integral intensities being theoretically calculated for the case of perfect ordering are calculated. The ordering degree S can be obtained by dividing the measurement value (IN1) obtained by the measurements by the theoretically calculated value (IN2) and then taking the square root of the divided the IN1. When the ordering degree S thus obtained is equal to or higher than 0.5, a magnetic anisotropy constant Ku suitable for a magnetic recording medium is obtained.

In accordance with the present invention, the magnetic recording layer 60 may have a structure in which even a larger number of magnetic recording layers are stacked. For example, the magnetic recording layer 60 may have a structure in which the abovementioned first magnetic recording layer and second magnetic recording layer are taken as a set, and a plurality of such sets is stacked, or a structure in which a magnetic recording layer constituted by a material that differs in composition or constituent elements from the first magnetic recording layer and the second magnetic recording layer is further stacked on those layers. The magnetic recording layer 60 may also have a structure in which different ordered alloy-carbon-containing nonmagnetic material combinations are alternately stacked, as in the structure in which the first magnetic recording layer, second magnetic recording layer, and first magnetic recording layer are stacked in the order of description. Furthermore, in accordance with the present invention, an additional layer such as a CAP layer may be provided on the magnetic recording layer 60. The first magnetic crystal grains and second magnetic crystal grains can be from different materials.

The magnetic recording layer 60 has at least the first magnetic recording layer 62 and the second magnetic recording layer 64 having the abovementioned configuration. In the first magnetic recording layer 62 in accordance with the present invention, the first nonmagnetic material surrounding the first nonmagnetic crystal grains is carbon (C). In the present invention, the second magnetic recording layer 64 with a granular structure imitating the granular structure of the first magnetic recording layer can be formed with good efficiency by forming the second magnetic recording layer 64 by using a granular magnetic material including a carbon-containing nonmagnetic material, which is the second nonmagnetic material, on the first nonmagnetic material.

As mentioned hereinabove, where MgO is used as the material of the seed layer 40, a magnetic recording layer having a high magnetic anisotropy at the desired film thickness cannot be formed on the seed layer by using the $L1_0$-type FePt—C, Fe—Pt—$B_4$C, FePt—SiC and the like as the magnetic recording layer.

By contrast, in accordance with the present invention, the increase in thickness of the entire magnetic recording layer 60 is realized, while maintaining a high magnetic anisotropy, by forming in advance the first magnetic recording layer as a magnetic recording layer using FePt—C as a material and then forming the second magnetic recording layer 64 including an ordered alloy with a carbon-containing nonmagnetic material added thereto, such as FePt—$B_4$C, FePt—B—C, FePt— and SiC, on the first magnetic recording layer 62, and also by further alternately forming a plurality of such magnetic recording layers.

In accordance with the present invention, the thickness of the first magnetic recording layer is equal to or less than 4 nm, preferably 2 nm to 4 nm. Where the thickness is greater than 4 nm, the growth of the ordered alloy is inhibited and secondary growth occurs. From the standpoint of maintaining a high magnetic anisotropy, it is preferred that the thickness of the second magnetic recording layer be 3 nm to 7 nm.

The thickness of the magnetic recording layer 60 is not particularly limited. However, from the standpoint of ensuring both a high productivity and a high recording density, it is preferred that the thickness of the magnetic recording layer 60 be at least equal to or greater than 5 nm, preferably equal to or greater than 8 nm. The preferred thickness of the magnetic recording layer 60 is 6 nm to 16 nm, more preferably 8 nm to 11 nm. Furthermore, the value of the magnetic anisotropy constant (Ku) of the magnetic recording medium in accordance with the present invention is preferably at least equal to or higher than 6.5E+06 erg/cm$^3$, more preferably equal to or higher than 1.0E+07 erg/cm$^3$, and even more preferably equal to higher than 1.2E+07 erg/cm$^3$.

Further, in the magnetic recording layer 60, the value of (Mr/Ms) obtained by dividing a residual magnetization (Mr) by a saturation magnetization (Ms) is preferably greater than 0.70, more preferably equal to or greater than 0.75. As mentioned hereinabove, in a magnetic material of a FePt-nonmagnetic material combination, where the content of carbon is high, the growth of the ordered alloy is inhibited and secondary growth occur, but where such secondary growth state occurs, Mr/Ms tends to decrease.

A Tc-controlling magnetic layer having a Curie temperature Tc different from that of the magnetic recording layer can be further arranged. By arranging the Tc-controlling magnetic layer and setting the recording temperature according to the Tc of the two layers, it is possible to reduce the inverted magnetic field of the entire magnetic recording medium, which is necessary during the recording. For example, the Curie temperature of the Tc-controlling magnetic layer is set lower than the Curie temperature of the magnetic recording layer. Where the recording temperature is set between the two Curie temperatures, the magnetization of the Tc-controlling magnetic layer is canceled during the recording, and the magnetic field necessary for inverting the recording decreases. Thus, the generation magnetic field during the recording, which is required for a magnetic recording head, is reduced and good magnetic recording performance can be realized.

The Tc-controlling magnetic layer may be arranged below or above the magnetic recording layer. It is preferred that the Tc-controlling magnetic layer have a granular structure. It is particularly preferred that the magnetic crystal grains of the magnetic recording layer and the Tc-controlling magnetic layer be arranged at about the same positions. By arranging the magnetic crystal grains at about the same positions, it is possible to improve the performance such as a signal-noise ratio (SNR).

The magnetic crystal grains constituting the Tc-controlling magnetic layer are preferably from a material including at least one from Co and Fe, and more preferably further include at least one element selected from Pt, Pd, Ni, Mn, Cr, Cu, Ag, and Au. For example, a CoCr based alloy, a CoCrPt based alloy, a FePt based alloy, or a FePd based alloy can be used. The crystal structure of the magnetic crystal grains can be an $L1_0$-type, $L1_1$-type, or $L1_2$-type ordered structure, a hcp structure (hexagonal close packed structure), or a fcc structure (face centered cubic structure).

The above-described carbon-containing nonmagnetic material, or an oxide such as $SiO_2$ and $TiO_2$, a nitride such as SiN and TiN, C, or B can be used as the material of a nonmagnetic crystal grain boundary constituting the Tc-controlling magnetic layer.

For adjusting the magnetic exchange coupling between the magnetic recording layer and the Tc-controlling magnetic layer, it is preferred that an exchange coupling control layer be arranged between the magnetic recording layer and the Tc-controlling magnetic layer. By adjusting the magnetic exchange coupling at the recording temperature, it is possible to adjust the inverted magnetic field. A layer having magnetic properties or a nonmagnetic layer can be selected according to the desired exchange coupling as the exchange coupling control layer. In order to enhance the effect of reducing the inverted magnetic field, it is preferred that a nonmagnetic layer be used.

A Ku-controlling magnetic layer having a uniaxial crystal magnetic anisotropy constant Ku different from that of the magnetic recording layer can be arranged. By arranging the Ku-controlling magnetic layer and setting adequate magnetic exchange coupling thereof with the magnetic recording layer, it is possible to improve thermal stability of the entire magnetic recording medium which is necessary when saving the recording.

The Ku-controlling magnetic layer may be provided below or above the magnetic recording layer. It is preferred that the Ku-controlling magnetic layer have a granular structure. It is particularly preferred that the magnetic crystal grains of the magnetic recording layer and the Ku-controlling magnetic layer be arranged at about the same positions. By arranging the magnetic crystal grains at about the same positions, it is possible to improve the performance such as a signal-noise ratio (SNR).

The magnetic crystal grains constituting the Ku-controlling magnetic layer are preferably from a material including at least one from Co and Fe, and more preferably further include at least one element selected from Pt, Pd, Ni, Mn, Cr, Cu, Ag, and Au. For example, a CoCr based alloy, a CoCrPt based alloy, a FePt based alloy, or a FePd based alloy can be used. The crystal structure of the magnetic crystal grains can be an $L1_0$-type, $L1_1$-type, or $L1_2$-type ordered structure, a hcp structure (hexagonal close packed structure), or a fcc structure (face centered cubic structure).

The above-described carbon-containing nonmagnetic material, or an oxide such as $SiO_2$ and $TiO_2$, a nitride such as SiN and TiN, C, or B can be used as the material of a nonmagnetic crystal grain boundary constituting the Ku-controlling magnetic layer.

For adjusting the magnetic exchange coupling between the magnetic recording layer and the Ku-controlling magnetic layer, it is preferred that an exchange coupling control layer be arranged between the magnetic recording layer and the Ku-controlling magnetic layer. By adjusting the magnetic exchange coupling at the recording, it is possible to adjust thermal stability. A layer having magnetic properties or a nonmagnetic layer can be selected according to the desired exchange coupling as the exchange coupling control layer. In order to enhance the effect of increasing thermal stability at the recording saving temperature, it is preferred that a nonmagnetic layer be used.

The optional protective layer 80 serves for protecting the constituent layers including the underlying magnetic recording layer 60 and layers therebelow. The protective layer 80 in the present invention can be formed from a material that is typically used in the field of magnetic recording media, for example, a material including carbon as the main component. The protective layer 80 may be a monolayer or may having a stacked structure. The protective layer 80 of a stacked structure may have a stacked structure of two carbon materials of different properties, a stacked structure of a metal and a carbon material, or a stacked structure of a metal oxide film and a carbon material. As for the film thickness of the protective layer, it is typically preferred that the thickness of the protective layer be equal to or less than 10 nm.

The optional lubricating layer can be formed using a liquid lubricant such as PFPE (perfluoropolyether). The thickness of the liquid lubricating layer is preferably such that the function of the liquid lubricating layer can be demonstrated with consideration for the properties of the protective layer.

A method for manufacturing the perpendicular magnetic recording medium in accordance with the present invention will be explained below. Initially, a nonmagnetic underlayer is formed, as necessary, on the nonmagnetic substrate 20. Then, the seed layer 40 is formed. Those layers can be formed by sputtering (including DC magnetron sputtering and RF magnetron sputtering) or vacuum vapor deposition. If necessary, as typically in the case of a glass substrate, an adhesive layer constituted by a metal such as Ta and Cr, or an alloy of such a metal can be formed on the nonmagnetic substrate.

The magnetic recording layer 60 is then formed. Initially, the first magnetic recording layer 62 is formed by sputtering or vacuum vapor deposition using an alloy target including metals constituting the ordered alloy and carbon.

Then, the second magnetic recording layer 64 is formed on the first magnetic recording layer 62. The second magnetic recording layer 64 can be formed by sputtering or vacuum vapor deposition using an alloy target including metals constituting the ordered alloy and the desired carbon-containing nonmetallic material.

In accordance with the present invention, it is desirable that the nonmagnetic substrate 20, which is a substrate for film growth, or the nonmagnetic substrate 20 on which adequate constituent layers have been formed be heated to a temperature of 300° C. to 500° C. in the step for growing the abovementioned first and second magnetic recording layers.

In the present invention, a co-sputtering method by which a material including an ordered alloy (for example, Fe and Pt), and C, or alloys thereof are sputtered individually can be used, in addition to the abovementioned sputtering method using an alloy target, as a method for forming the first magnetic recording layer 62 and the second magnetic recording layer.

Then, the protective layer 80 is formed on the magnetic recording layer 60. The protective layer 80 can be formed using the abovementioned materials by using any method known in the pertinent field, for example, sputtering (including DC magnetron sputtering) and vacuum vapor deposition.

Further, the optional liquid lubricating layer can be formed using a material (for example, a perfluoropolyether based lubricant) that has been generally used in the field of magnetic recording media. The liquid lubricating layer can be formed, for example, using a coating method such as dip coating and spin coating.

EXAMPLES

The present invention is explained below in greater detail by examples thereof.

(I) Examples 1 to 17 and Comparative Examples 1 to 9

(i) Examples 1 to 3

A perpendicular magnetic recording medium was fabricated that had a nonmagnetic substrate and a Ta adhesive layer, a Cr underlayer, a MgO seed layer, an ordered alloy (FePt based) magnetic recording layer, and a carbon (C) protective layer provided on the substrate in the order of description. In Examples 1-3, FePt—C was used for the first magnetic recording layer, and FePt—B$_4$C was used for the second magnetic recording layer.

A chemically strengthened glass substrate (glass substrate N-10, manufactured by HOYA) was prepared as the nonmagnetic substrate. The nonmagnetic substrate was introduced in a sputtering apparatus. Film growth was conducted from the Ta adhesive layer to the C protective layer in an inline film growth apparatus, while maintaining the controlled atmosphere. The Ta adhesive layer was grown to a thickness of 5 nm by DC magnetron sputtering in an Ar atmosphere by using a pure Ta target. Then, the Cr underlayer was grown to a thickness of 20 nm by DC magnetron sputtering under the Ar atmosphere by using a pure Cr target.

The substrate was then heated to 300° C., and the seed layer with a thickness of 5 nm was grown by RF sputtering by using a MgO target. The MgO layer, which was the seed layer, was grown at a RF power of 200 W under the Ar atmosphere with a degree of vacuum of 0.1 Pa.

The first magnetic recording layer was then grown. The first magnetic recording layer was a FePt—C layer. Initially, the substrate on which the abovementioned layers were grown was heated to 400° C. and the first magnetic recording layer with the thickness shown in Table 1 was grown by DC magnetron sputtering by using a target including FePt and C that was adjusted to obtain the composition during the growth of FePt (vol %)-C (vol %) which is shown in Table 1. The first magnetic recording layer (FePt—C layer) was grown at a DC power of 100 W under an Ar gas atmosphere with a vacuum degree of 1.0 Pa.

The second magnetic recording layer was then grown. The second magnetic recording layer of the present example was a FePt—B$_4$C layer. The growth was performed in the following manner. The substrate with the first magnetic recording layer grown thereon in the above-described manner was heated to 400° C. In this state, the second magnetic recording layer was grown to a thickness shown in Table 1 by DC magnetron sputtering by using a target including FePt and boron carbide that was adjusted to obtain the composition during the growth of FePt (vol %)-B$_4$C (vol %) which is shown in Table 1. The second magnetic recording layer (FePt—B$_4$ layer) was grown at a DC power of 100 W under an Ar gas atmosphere with a vacuum degree of 1.0 Pa.

A carbon protective layer with a thickness of 3 nm was then formed by DC magnetron sputtering by using a carbon target under an Ar gas atmosphere, and a magnetic recording medium was obtained.

TABLE 1

| | Magnetic recording layer[3] (second layer/first layer) | Underlayer | Film growth conditions | | | Film composition[1][3] | | Film thickness (nm) | | |
|---|---|---|---|---|---|---|---|---|---|---|
| | | | Pressure (Pa) | Power[2] (W) | Temp. (° C.) | C content (vol %) | B$_4$C content (vol %) | First layer | Second layer | Entire film |
| Example | | | | | | | | | | |
| 1 | FePt•B$_4$C/FePt•C | MgO | 1 | 100/100 | 400 | 25 | 25 | 2.2 | 3 | 5.2 |
| 2 | FePt•B$_4$C/FePt•C | MgO | 1 | 100/100 | 400 | 25 | 25 | 2.2 | 5 | 7.2 |
| 3 | FePt•B$_4$C/FePt•C | MgO | 1 | 100/100 | 400 | 25 | 25 | 2.2 | 7 | 9.2 |

[1] The content of the ordered alloy (FePt) in the first and second magnetic recording layers is a remaining amount obtained by subtracting the amount of carbon (C) and carbide additive from 100 vol %.
[2] The numerical value in the Power column relates to the films of the second magnetic recording layer/first magnetic recording layer.
[3] "First layer" and "second layer" represent the first magnetic recording layer and second magnetic recording layer, respectively.

(ii) Examples 4 to 6

A perpendicular magnetic recording medium was fabricated that had a nonmagnetic substrate and a Ta adhesive layer, a Cr underlayer, a MgO seed layer, an ordered alloy (FePt based) magnetic recording layer, and a carbon (C)

protective layer provided in the order of description on the nonmagnetic substrate. In Examples 4 to 6, FePt—C was used for the first magnetic recording layer, and FePt—SiC was used for the second magnetic recording layer.

A chemically strengthened glass substrate (glass substrate N-10, manufactured by HOYA) was prepared as the nonmagnetic substrate. The nonmagnetic substrate was introduced in a sputtering apparatus. Film growth was conducted from the Ta adhesive layer to the C protective layer in an inline film growth apparatus, while maintaining the controlled atmosphere. The Ta adhesive layer was grown to a thickness of 5 nm by DC magnetron sputtering in an Ar atmosphere by using a pure Ta target. Then, the Cr underlayer was grown to a thickness of 20 nm by DC magnetron sputtering under the Ar atmosphere by using a pure Cr target.

The substrate was then heated to 300° C., and the seed layer with a thickness of 5 nm was grown by RF sputtering by using a MgO target. The MgO layer, which was the seed layer, was grown at a RF power of 200 W under the Ar atmosphere with a degree of vacuum of 0.1 Pa.

The first magnetic recording layer was then grown. The first magnetic recording layer was a FePt—C layer. Initially, the substrate on which the abovementioned layers were grown was heated to 400° C. and the first magnetic recording layer with the thickness shown in Table 2 was grown by DC magnetron sputtering by using a target including FePt and C that was adjusted to obtain the composition during the growth of FePt (vol %)-C (vol %) which is shown in Table 2. The first magnetic recording layer (FeP—C layer) was grown at a DC power of 100 W under an Ar gas atmosphere with a vacuum degree of 1.0 Pa.

The second magnetic recording layer was then grown. The second magnetic recording layer of the present example was a FePt—SiC layer. The growth was performed in the following manner. The substrate with the first magnetic recording layer grown thereon in the above-described manner was heated to 400° C. In this state, the second magnetic recording layer was grown to a thickness shown in Table 2 by DC magnetron sputtering by using a target including FePt and SiC that was adjusted to obtain the composition during the growth of FePt (vol %)-SiC (vol %) which is shown in Table 2. The second magnetic recording layer (FeP—SiC layer) was grown at a DC power of 100 W under an Ar gas atmosphere with a vacuum degree of 1.0 Pa.

A carbon protective layer with a thickness of 3 nm was then formed by DC magnetron sputtering by using a carbon target under an Ar gas atmosphere, and a magnetic recording medium was obtained.

(iii) Examples 7 to 17

A perpendicular magnetic recording medium was fabricated that had a nonmagnetic substrate and a Ta adhesive layer, a Cr underlayer, a MgO seed layer, an ordered alloy (FePt based) magnetic recording layer, and a carbon (C) protective layer provided in the order of description on the nonmagnetic substrate. In Examples 7 to 17, FePt—C was used for the first magnetic recording layer, and FePt—B—C was used for the second magnetic recording layer. In Examples 7 to 17, the content ratio of carbon (C) in the first magnetic recording layer was fixed to 40 vol % or 25 vol %, and magnetic characteristics were evaluated by changing the content ratio of boron (B) and carbon (C) in the second magnetic recording layer. Thus, in Examples 7 to 10, the content ratio of carbon (C) in the first magnetic recording layer was fixed to 40 vol %, the total B—C amount in the second magnetic recording layer was fixed to 25 vol %, and the content ratio of boron (B) and carbon (C) in the second magnetic recording layer was changed. In Examples 11 and 12, the content ratio of carbon (C) in the first magnetic recording layer was fixed to 25 vol %, the total B—C amount in the second magnetic recording layer was fixed to 25 vol %, and the content ratio of boron (B) and carbon (C) in the second magnetic recording layer was changed. In Examples 13 to 17, the content ratio of C in the first magnetic recording layer was fixed to 40 vol % and the total amount of B—C in the second magnetic recording layer was changed.

A chemically strengthened glass substrate (glass substrate N-10, manufactured by HOYA) was prepared as the nonmagnetic substrate. The nonmagnetic substrate was introduced in a sputtering apparatus. Film growth was conducted from the Ta adhesive layer to the C protective layer in an inline film growth apparatus, while maintaining the controlled atmosphere. The Ta adhesive layer was grown to a thickness of 5 nm by DC magnetron sputtering in an Ar atmosphere by using a pure Ta target. Then, the Cr underlayer was grown to a thickness of 20 nm by DC magnetron sputtering under the Ar atmosphere by using a pure Cr target.

The substrate was then heated to 300° C., and the seed layer with a thickness of 5 nm was grown by RF sputtering by using a MgO target. The MgO layer, which was the seed layer, was grown at a RF power of 200 W under the Ar atmosphere with a degree of vacuum of 0.1 Pa.

The first magnetic recording layer was then grown. The first magnetic recording layer was a FePt—C layer. Initially, the substrate on which the abovementioned layers were grown was heated to 400° C. and the first magnetic record-

TABLE 2

| Example | Magnetic recording layer[3] (second layer/first layer) | Underlayer | Film forming conditions | | | Film composition[1] [3] | | Film thickness (nm) | | |
|---|---|---|---|---|---|---|---|---|---|---|
| | | | Pressure (Pa) | Power[2] (W) | Temp. (° C.) | C content (vol %) | SiC content (vol %) | First layer | Second layer | Entire film |
| 4 | FePt•SiC/FePt•C | MgO | 1 | 100/100 | 400 | 25 | 25 | 2.2 | 3 | 5.2 |
| 5 | FePt•SiC/FePt•C | MgO | 1 | 100/100 | 400 | 25 | 25 | 2.2 | 5 | 7.2 |
| 6 | FePt•SiC/FePt•C | MgO | 1 | 100/100 | 400 | 25 | 25 | 2.2 | 7 | 9.2 |

[1] The content of the ordered alloy (FePt) in the first and second magnetic recording layers is a remaining amount obtained by subtracting the amount of carbon (C) and carbide additive from 100 vol %.
[2] The numerical value in the Power column relates to the films of the second magnetic recording layer/first magnetic recording layer.
[3] "First layer" and "second layer" represent the first magnetic recording layer and second magnetic recording layer, respectively.

ing layer with the thickness shown in Table 3 was grown by DC magnetron sputtering by using a target including FePt and C that was adjusted to obtain the composition during the growth of FePt (vol %)-C (vol %) which is shown in Table 3. The first magnetic recording layer (FePt—C layer) was grown at a DC power of 100 W under an Ar gas atmosphere with a vacuum degree of 1.0 Pa.

The second magnetic recording layer was then grown. The second magnetic recording layer of the present example was a FePt—B—C layer. The growth was performed in the following manner. The substrate with the first magnetic recording layer grown thereon in the above-described manner was heated to 400° C. In this state, the second magnetic recording layer was grown to a thickness shown in Table 3 by DC magnetron sputtering by using a target including FePt, boron (B), and carbon (C) that was adjusted to obtain the composition during the growth of FePt (vol %)-B—C (vol %) which is shown in Table 3. The second magnetic recording layer (FePt—B—C layer) was grown at a DC power of 100 W under an Ar gas atmosphere with a vacuum degree of 1.0 Pa.

TABLE 3

| | Magnetic recording layer[3] | | Film forming conditions | | | C content in first layer (vol %) | Second layer, B•C content, composition | | | | Film thickness (nm) | | |
|---|---|---|---|---|---|---|---|---|---|---|---|---|---|
| Example | (second layer/first layer) | Under layer | Pressure (Pa) | Power[2] (W) | Temp. (° C.) | | Total B•C amt. (vol %) | B content (at %) | C content (at %) | B/C ratio | First layer | Second layer | Entire film |
| 7 | FePt•B•C/FePt•C | MgO | 1 | 100/100 | 400 | 40 | 25 | 60 | 40 | 1.5 | 2.2 | 5 | 7.2 |
| 8 | FePt•B•C/FePt•C | MgO | 1 | 100/100 | 400 | 40 | 25 | 55.6 | 44.4 | 1.3 | 2.2 | 5 | 7.2 |
| 9 | FePt•B•C/FePt•C | MgO | 1 | 100/100 | 400 | 40 | 25 | 76.9 | 23.1 | 3.3 | 2.2 | 5 | 7.2 |
| 10 | FePt•B•C/FePt•C | MgO | 1 | 100/100 | 400 | 40 | 25 | 80 | 20 | 4.0 | 2.2 | 5 | 7.2 |
| 11 | FePt•B•C/FePt•C | MgO | 1 | 100/100 | 400 | 25 | 25 | 28.6 | 71.4 | 0.4 | 2.2 | 5 | 7.2 |
| 12 | FePt•B•C/FePt•C | MgO | 1 | 100/100 | 400 | 25 | 25 | 83.3 | 16.7 | 5.0 | 2.2 | 5 | 7.2 |
| 13 | FePt•B•C/FePt•C | MgO | 1 | 100/100 | 400 | 40 | 13.7 | 67 | 33 | 2.0 | 2.2 | 5 | 7.2 |
| 14 | FePt•B•C/FePt•C | MgO | 1 | 100/100 | 400 | 40 | 33.4 | 23.7 | 76.3 | 0.3 | 2.2 | 5 | 7.2 |
| 15 | FePt•B•C/FePt•C | MgO | 1 | 100/100 | 400 | 40 | 20.6 | 78.3 | 21.7 | 3.6 | 2.2 | 5 | 7.2 |
| 16 | FePt•B•C/FePt•C | MgO | 1 | 100/100 | 400 | 40 | 28.9 | 51.9 | 48.1 | 1.1 | 2.2 | 5 | 7.2 |
| 17 | FePt•B•C/FePt•C | MgO | 1 | 100/100 | 400 | 40 | 28.9 | 68.5 | 31.5 | 2.2 | 2.2 | 5 | 7.2 |

[1]The content of the ordered alloy (FePt) in the first and second magnetic recording layers is a remaining amount obtained by subtracting the total amount of carbon (C) and boron (B) from 100 vol %.
[2]The numerical value in the Power column relates to the films of the second magnetic recording layer/first magnetic recording layer.
[3]"First layer" and "second layer" represent the first magnetic recording layer and second magnetic recording layer, respectively.

(iv) Comparative Examples 1 to 6

Magnetic recording media having a monolayer magnetic recording layer were fabricated as comparative examples. The magnetic recording layer was ordered alloy-nonmagnetic material combination of the composition shown in Table 4. The magnetic recording media having the magnetic recording layers shown in Table 4 were grown in the same manner as in Examples 1 to 6. However, since the magnetic recording layer in the comparative examples was a monolayer, the "FePt—C layer" was grown under the growth conditions of the first magnetic recording layer in Examples 1 to 6, the "FePt—B$_4$C layer" was grown under the growth conditions of the second magnetic recording layer in Examples 1 to 3, and the "FePt—SiC layer" was grown under the growth conditions of the second magnetic recording layer in Examples 4 to 6.

TABLE 4

| | | | Film forming conditions | | | Film composition[1] | | | |
|---|---|---|---|---|---|---|---|---|---|
| Comparative Example | Magnetic recording layer | Underlayer | Pressure (Pa) | Power (W) | Temp. (° C.) | C content (vol %) | B$_4$C content (vol %) | SiC content (vol %) | Film thickness[3] (nm) |
| 1 | FePt•C | MgO | 1 | 100 | 400 | 25 | — | — | 2.2 |
| 2 | FePt•C | MgO | 1 | 100 | 400 | 25 | — | — | 4.5 |
| 3 | FePt•C | MgO | 1 | 100 | 400 | 25 | — | — | 7.8 |
| 4 | FePt•C | MgO | 1 | 100 | 400 | 25 | — | — | 10.0 |
| 5 | FePt•B$_4$C | MgO | 1 | 100 | 400 | — | 25 | — | 4 |
| 6 | FePt•SiC | MgO | 1 | 100 | 400 | — | — | 25 | 4 |

[1]The content of the ordered alloy (FePt) in the first and second magnetic recording layers is a remaining amount obtained by subtracting the amount of carbon (C) and carbide additive from 100 vol %.

(v) Comparative Examples 7 and 8

Magnetic recording media having a two-layer magnetic recording layer were fabricated as separate comparative examples.

A perpendicular magnetic recording medium was fabricated that had a nonmagnetic substrate and a Ta adhesive layer, a Cr underlayer, a MgO seed layer, an ordered alloy (FePt based) magnetic recording layer, and a carbon (C) protective layer provided in the order of description on the nonmagnetic substrate. In Comparative Examples 7 and 8, FePt—C was used for the first and second magnetic recording layers.

A chemically strengthened glass substrate (glass substrate N-10, manufactured by HOYA) was prepared as the nonmagnetic substrate. The nonmagnetic substrate was introduced in a sputtering apparatus. Film growth was conducted from the Ta adhesive layer to the C protective layer in an inline film growth apparatus, while maintaining the controlled atmosphere. The Ta adhesive layer was grown to a thickness of 5 nm by DC magnetron sputtering in an Ar atmosphere by using a pure Ta target. Then, the Cr underlayer was grown to a thickness of 20 nm by DC magnetron sputtering under the Ar atmosphere by using a pure Cr target.

The substrate was then heated to 300° C., and the seed layer with a thickness of 5 nm was grown by RF sputtering by using a MgO target. The MgO layer, which was the seed layer, was grown at a RF power of 200 W under the Ar atmosphere with a degree of vacuum of 0.1 Pa.

The first magnetic recording layer was then grown. The first magnetic recording layer was a FePt—C layer. Initially, the substrate on which the abovementioned layers were grown was heated to 400° C. and the first magnetic recording layer with the thickness shown in Table 5 was grown by DC magnetron sputtering by using a target including FePt and C that was adjusted to obtain the composition during the growth of FePt (vol %)-C (vol %) which is shown in Table 5. The first magnetic recording layer (FePt—C layer) was grown at a DC power of 100 W under an Ar gas atmosphere with a vacuum degree of 1.0 Pa.

The second magnetic recording layer was then grown. The second magnetic recording layer of the present comparative examples was a FePt—C layer. The growth was performed in the following manner. The substrate with the first magnetic recording layer grown thereon in the above-described manner was heated to 400° C. In this state, the second magnetic recording layer was grown to a thickness shown in Table 5 by DC magnetron sputtering by using a target including FePt and carbon that was adjusted to obtain the composition during the growth of FePt (vol %)-C (vol %) which is shown in Table 5. The second magnetic recording layer (FePt—C layer) was grown at a DC power of 100 W under an Ar gas atmosphere with a vacuum degree of 1.0 Pa.

TABLE 5

| Comparative Example | Magnetic recording layer[3] (second layer/ first layer) | Underlayer | Film forming conditions | | | Film composition[1] [3] | | | Film thickness (nm) | | |
|---|---|---|---|---|---|---|---|---|---|---|---|
| | | | Pressure (Pa) | Power[2] (W) | Temp. (° C.) | C content in first layer (vol %) | Second layer, B or C content | | First layer | Second layer | Entire film |
| | | | | | | | B content (at %) | C content (at %) | | | |
| 7 | FePt•C/FePt•C | MgO | 1 | 100/100 | 400 | 40 | — | 25 | 2 | 5 | 7 |
| 8 | FePt•C/FePt•C | MgO | 1 | 100/100 | 400 | 25 | — | 25 | 2 | 5 | 7 |

[1])The content of the ordered alloy (FePt) in the first and second magnetic recording layers is a remaining amount obtained by subtracting the amount of carbon (C) and boron (B) additive from 100 vol %.
[2])The numerical value in the Power column relates to the films of second magnetic recording layer/first magnetic recording layer.
[3])"First layer" and "second layer" represent the first magnetic recording layer and second magnetic recording layer, respectively.

(vi) Comparative Example 9

In the present comparative example, the second magnetic recording layer was FePt—$SiO_2$ in a two-layer magnetic recording medium. The film forming conditions of the present comparative example were the same as in Comparative Examples 7 and 8, except that the target including FePt and $SiO_2$ was prepared such as to obtain FePt (75 vol %)-$SiO_2$ (25 vol %) during the growth of the second magnetic recording layer, and the first magnetic recording layer and the second magnetic recording layer each had a thickness of 3 nm (total thickness 6 nm). The magnetic recording medium obtained in the present comparative example had a Ku of 1.80E+07 erg/$cm^3$ and a Mr/Ms value of 0.95.

(vii) Evaluation of Examples 1 to 17 and Comparative Examples 1 to 8

(A) Results Obtained in Examples 1 to 6 and Comparative Examples 1 to 6

The magnetic recording media were evaluated by evaluating the magnetic anisotropy constant (Ku). More specifically, the dependence of spontaneous magnetization on the magnetic field application angle was evaluated by using a PPMS device (Physical Property Measurement System) (manufactured by Quantum Design Co.), saturation magnetization (Ms) was determined using a vibrating sample magnetometer (VSM), and the Ku value was calculated on the basis of non-Patent Literature 3 and 4.

A coercivity (Hc) and an α value of an M-H hysteresis loop (inclination of the magnetization curve close to the coercivity) were determined in addition to the magnetic anisotropy constant. The α value of an M-H hysteresis loop is known to be α=1 in the case of an ideal granular medium.

The specific measurement method involved using the PPMS device to evaluate the M-H hysteresis loop, and determining the α value from the saturation magnetization (Ms) obtained using VSM and the inclination (dM/dH) close to the coercivity (Hc). The preferred range for the α value is from 0.6 (inclusive) to 2.5 (inclusive).

The results are shown in Table 6.

TABLE 6

| | Configuration of magnetic recording layer[2)] | Film thickness[2)] (nm) | Ku (erg/cm$^3$) ($10^{-1}$ J/m$^3$) | Hc (kOe) ([ ]: (× $10^6$ A/m)) | α value of hysteresis loop |
|---|---|---|---|---|---|
| Example 1 | FePt · B$_4$C/FePt · C | 5.2 | 1.60E+07 | 16.5 [1.31] | 0.8 |
| Example 2 | FePt · B$_4$C/FePt · C | 7.2 | 1.00E+07 | 11.2 [0.89] | 1.2 |
| Example 3 | FePt · B$_4$C/FePt · C | 9.2 | 1.20E+07 | 13.1 [1.04] | 1.1 |
| Example 4 | FePt · SiC/FePt · C | 5.2 | 1.60E+07 | 17.0 [1.35] | 2.3 |
| Example 5 | FePt · SiC/FePt · C | 7.2 | 1.10E+07 | 8.6 [0.68] | 1.8 |
| Example 6 | FePt · SiC/FePt · C | 9.2 | 1.00E+07 | 7.6 [0.61] | 2.4 |
| Comparative Example 1 | FePt · C | 2.2 | 1.55E+07 | 9.2 [0.73] | 0.4 |
| Comparative Example 2 | FePt · C | 4.5 | 9.87E+06 | 9.3 [0.74] | 0.4 |
| Comparative Example 3 | FePt · C | 7.8 | 6.35E+06 | 9.3 [0.74] | 0.4 |
| Comparative Example 4 | FePt · C | 10.0 | 2.68E+06 | 10.6 [0.84] | Non measured |
| Comparative Example 5 | FePt · B$_4$C | 4 | 5.11E+06 | 1.2 [0.095] | 7.4 |
| Comparative Example 6 | FePt · SiC | 4 | 4.34E+06 | 0.1 [0.01] | 3.3 |

[1)]The configuration in Examples 1 to 6 is second magnetic recording layer/first magnetic recording layer.
[2)]The film thickness in Examples 1 to 6 is the total film thickness.

Figure 6:
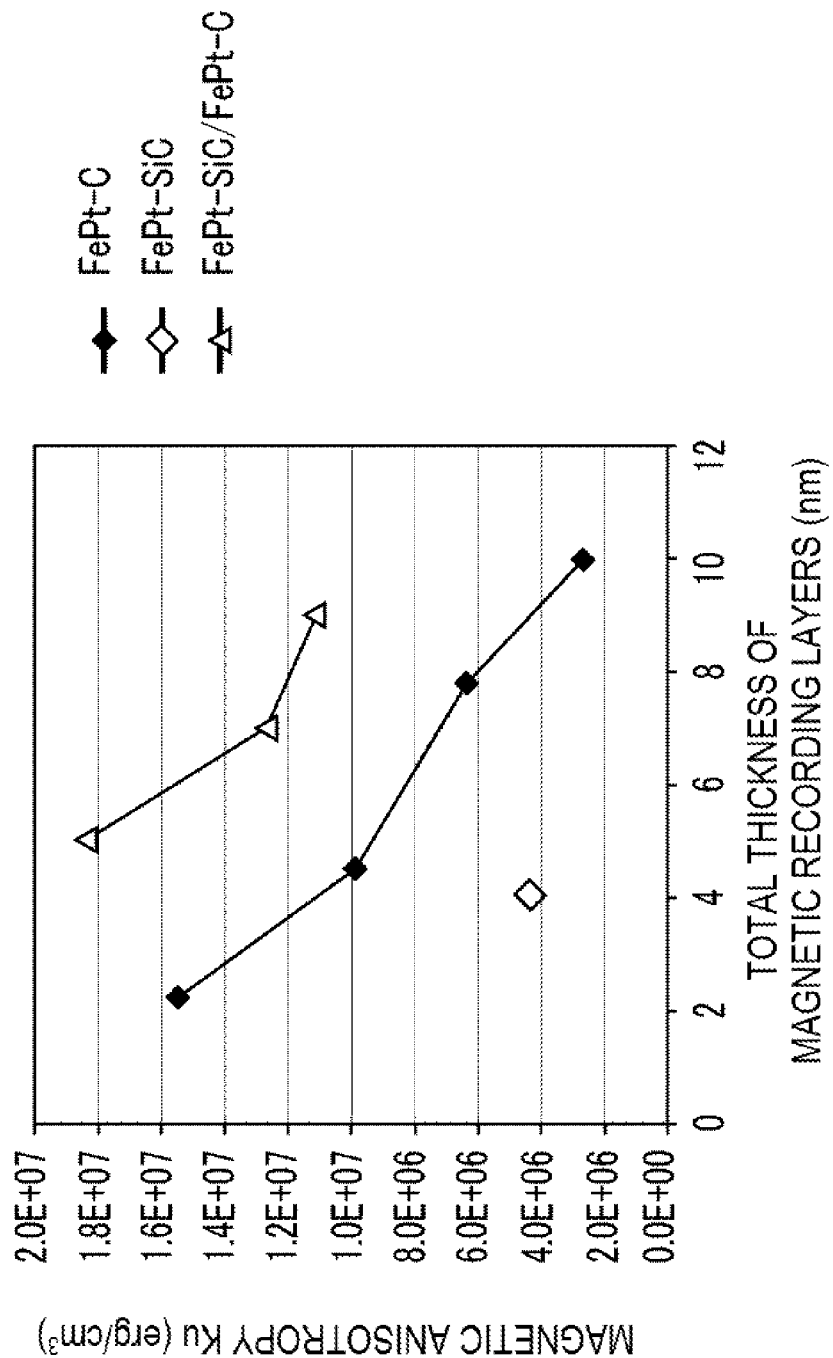
FIG. 6 shows the measurement result relating to the magnetic anisotropy constant (Ku) of the magnetic recording media of Examples 4 to 6 and Comparative Examples 1 to 4 and 6.

The values of Ku are also collected in FIGS. 5 and 6. FIG. 5 compares the results obtained in Examples 1 to 3 and Comparative Examples 1 to 5. FIG. 6 compares the results obtained in Examples 4 to 6 and Comparative Examples 1 to 4 and 6. For reference, FIG. 5 also shows the results for [B—C/C] (black circles) obtained in the below-described Example 11.

(A-1) Results for Magnetic Recording Medium Including FePt—B$_4$C/FePt—C(Second Magnetic Recording Layer/First Magnetic Recording Layer)

The Ku values indicate that in the magnetic recording medium constituted by a FePt—C monolayer, Ku greatly decreases with the increase in film thickness, and the magnetic anisotropy also decreases with the increase in film thickness. Further, in the magnetic recording medium constituted by a FePt—B$_4$C monolayer, Ku is small and the magnetic anisotropy is low even at the film thickness of 4 nm. Meanwhile, in the magnetic recording medium obtained by stacking FePt—B$_4$C on FePt—C, which is the magnetic recording medium in accordance with the present invention, a significant decrease in the Ku value could be prevented even when the film thickness is increased. Further, the results obtained for the coercivity (Hc) and α value of hysteresis loop were also better than those obtained in the comparative examples.

(A-2) Results for Magnetic Recording Medium Including FePt—SiC/FePt—C(Second Magnetic Recording Layer/First Magnetic Recording Layer)

The Ku values indicate that in the magnetic recording medium constituted by a FePt—C monolayer, Ku greatly decreases with the increase in film thickness, and the magnetic anisotropy also decreases with the increase in film thickness. Further, in the magnetic recording medium constituted by a FePt—SiC monolayer, Ku is small and the magnetic anisotropy is low even at the film thickness of 4 nm. Meanwhile, in the magnetic recording medium obtained by stacking FePt—SiC on FePt—C, which is the magnetic recording medium in accordance with the present invention, the Ku value could be as a whole increased, even when the film thickness is increased, by comparison with the magnetic recording medium including a FePt—C monolayer as a magnetic recording layer. Further, the results obtained for the coercivity (Hc) and α value of hysteresis loop were also better than those obtained in the comparative examples.

On the basis of the abovementioned test results, the following characteristics of the nonmagnetic material in the ordered alloy-nonmagnetic material combination can be considered.

(a) Carbon (C) has a high diffusion rate in FePt crystals and can be readily released from inside the FePt crystal grains. However, at a film thickness of 4 nm, carbon also diffuses to the upper surface of FePt crystal grains (columnar growth) and secondary growth of FePt crystals is induced.

(b) B$_4$C has the slowest diffusion and easily remains inside the FePt crystal grains, and it does not diffuse to the upper surface of FePt crystal grains (columnar growth). For this reason, a large Ku value is not obtained, but Ku does not decrease even when the film thickness increases. B$_4$C is relatively unlikely to form a granular structure on the MgO seed layer.

(c) SiC apparently has properties between those of carbon (C) and B$_4$C, and the release thereof to portions of nonmagnetic grain boundaries can be found to advance to a certain degree in parallel with the growth of the magnetic recording layer. However, for example, in the above-described example, at a thickness of the FePt—C magnetic recording layer of 2 nm, the diffusion of SiC to the columnar growth surface of FePt crystal grains is less than in the magnetic recording medium including the FePt—C monolayer as the magnetic recording layer, and the secondary growth of the FePt crystal grains, which follows the increase in the thickness of the magnetic recording layer, can be comparatively well suppressed up to a thickness of the FePt—SiC magnetic recording layer of 3 nm. As a result, a very high Ku value can be obtained in the monolayer up to the abovementioned thickness. However, as the thickness of the FePt—SiC layer increases, SiC also diffuses to the columnar growth surface of the FePt crystal grains and the secondary growth can be induced.

(B) Results Obtained in Examples 7 to 17 and Comparative Examples 7 and 8

In the examples, the magnetic anisotropy constant (Ku) and (Mr/Ms) obtained by dividing the residual magnetization (Mr) by saturation magnetization (Ms) were evaluated. Mr can be measured with a VSM. In the magnetic material of the FePt-nonmagnetic material combination, as mentioned hereinabove, where the content of carbon is high, the growth of the ordered alloy is inhibited and the secondary growth occurs, and in the secondary growth state, Mr/Ms tends to decrease. This is why this ratio was the evaluation item in the present examples. Further, where Mr/Ms is low, it means that grains having no magnetization orientation in the direction of magnetization are present when the magnetic field applied during magnetic recording becomes zero, and such grains undesirably become a source of noise in the reproduction signal in magnetic recording. In the present invention, it is preferred that the Mr/Ms value be above 0.70.

The results relating to the magnetic anisotropy constant (Ku) and Mr/Ms of the magnetic recording media in Examples 7 to 17 and Comparative Examples 7 and 8 are shown in Table 7.

TABLE 7

| | Configuration of magnetic recording layer[1] (second layer/first layer) | Film thickness[2] (nm) | B/C ratio of second layer[1] | Ku (erg/cm$^3$) ($10^{-1}$ J/m$^3$) | Mr/Ms |
|---|---|---|---|---|---|
| Example 7 | FePt · B · C/FePt · C | 7.2 | 1.5 | 1.28E+07 | 0.86 |
| Example 8 | FePt · B · C/FePt · C | 7.2 | 1.3 | 1.32E+07 | 0.91 |
| Example 9 | FePt · B · C/FePt · C | 7.2 | 3.3 | 1.30E+07 | 0.92 |
| Example 10 | FePt · B · C/FePt · C | 7.2 | 4.0 | 1.29E+07 | 0.92 |
| Example 11 | FePt · B · C/FePt · C | 7.2 | 0.4 | 1.50E+07 | 0.94 |
| Example 12 | FePt · B · C/FePt · C | 7.2 | 5.0 | 1.49E+07 | 0.96 |
| Example 13 | FePt · B · C/FePt · C | 7.2 | 2.0 | 1.97E+07 | 0.87 |
| Example 14 | FePt · B · C/FePt · C | 7.2 | 0.3 | 6.67E+06 | 0.74 |
| Example 15 | FePt · B · C/FePt · C | 7.2 | 3.6 | 1.37E+07 | 0.92 |
| Example 16 | FePt · B · C/FePt · C | 7.2 | 1.1 | 9.51E+06 | 0.75 |
| Example 17 | FePt · B · C/FePt · C | 7.2 | 2.2 | 9.85E+06 | 0.80 |
| Comparative Example 7 | FePt · C/FePt · C | 7 | 0 | 4.63E+06 | 0.49 |
| Comparative Example 8 | FePt · C/FePt · C | 7 | 0 | 6.35E+06 | 0.70 |

[1]The first layer and second layer are the first magnetic recording layer and the second magnetic recording layer, respectively.
[2]The film thickness is the total film thickness.

Figure 7:
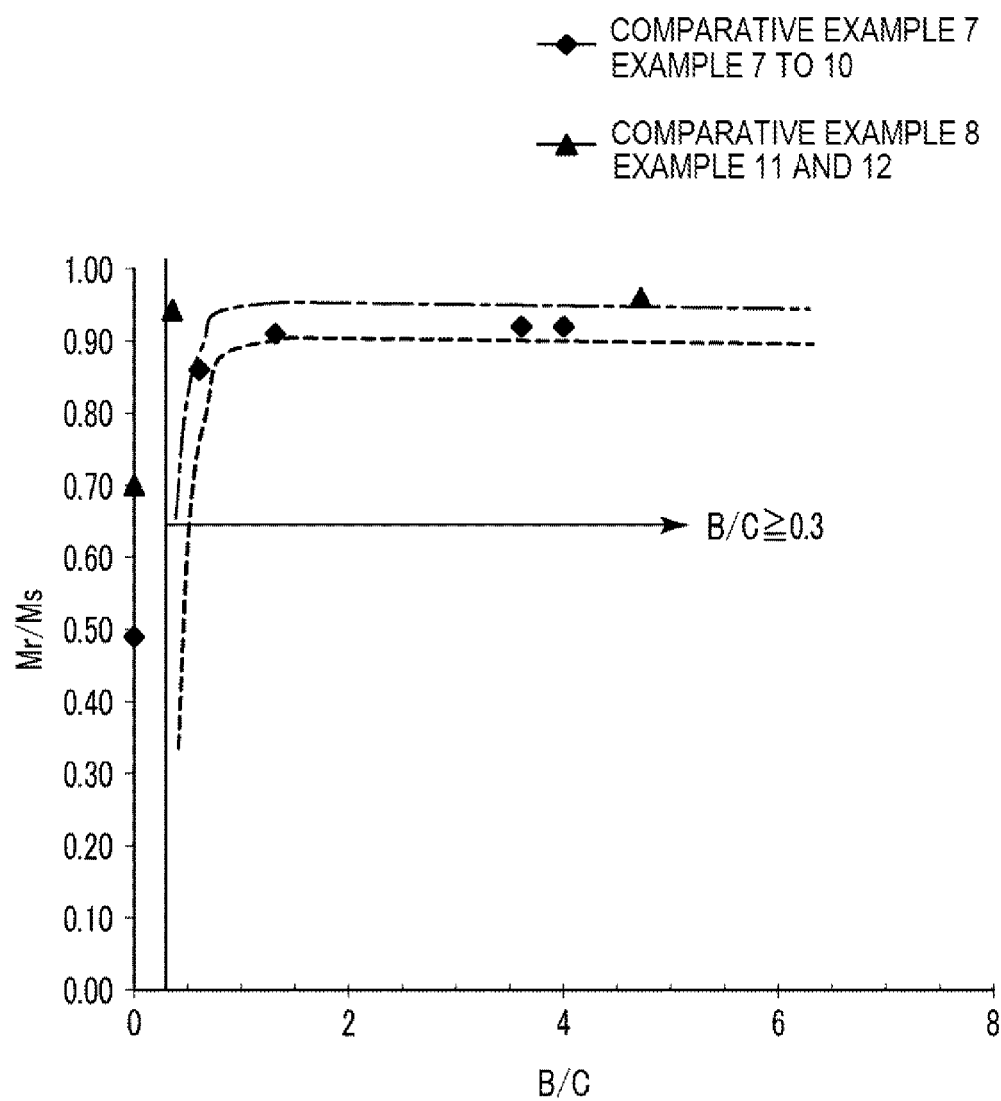
FIG. 7 compares the results obtained in Examples 7 to 10 and Comparative Example 7 and the results obtained in Examples 11 and 12 and Comparative Example 8.
Figure 8:
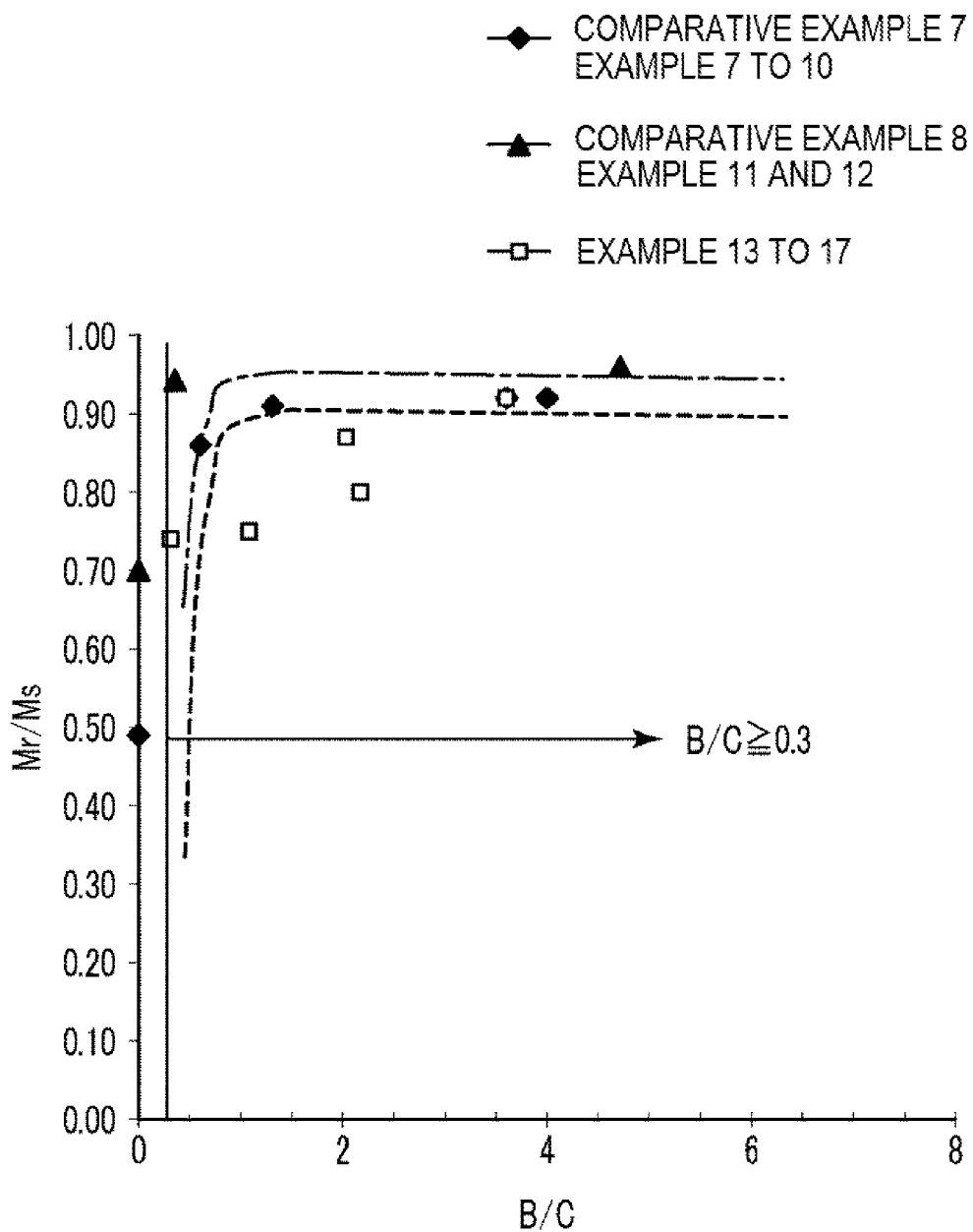
FIG. 8 compares the results by further adding the results obtained in Example 13 to 17 to those shown in FIG. 7.

The Mr/Ms values are also collected in FIGS. 7 and 8. FIG. 7 compares the results obtained in Examples 7 to 10 and Comparative Example 7 and also the results obtained in Examples 11 and 12 and Comparative Example 8. In FIG. 8, the results obtained in Examples 13 to 17 are further added, for comparison, to the results shown in FIG. 7.

Figure 9:
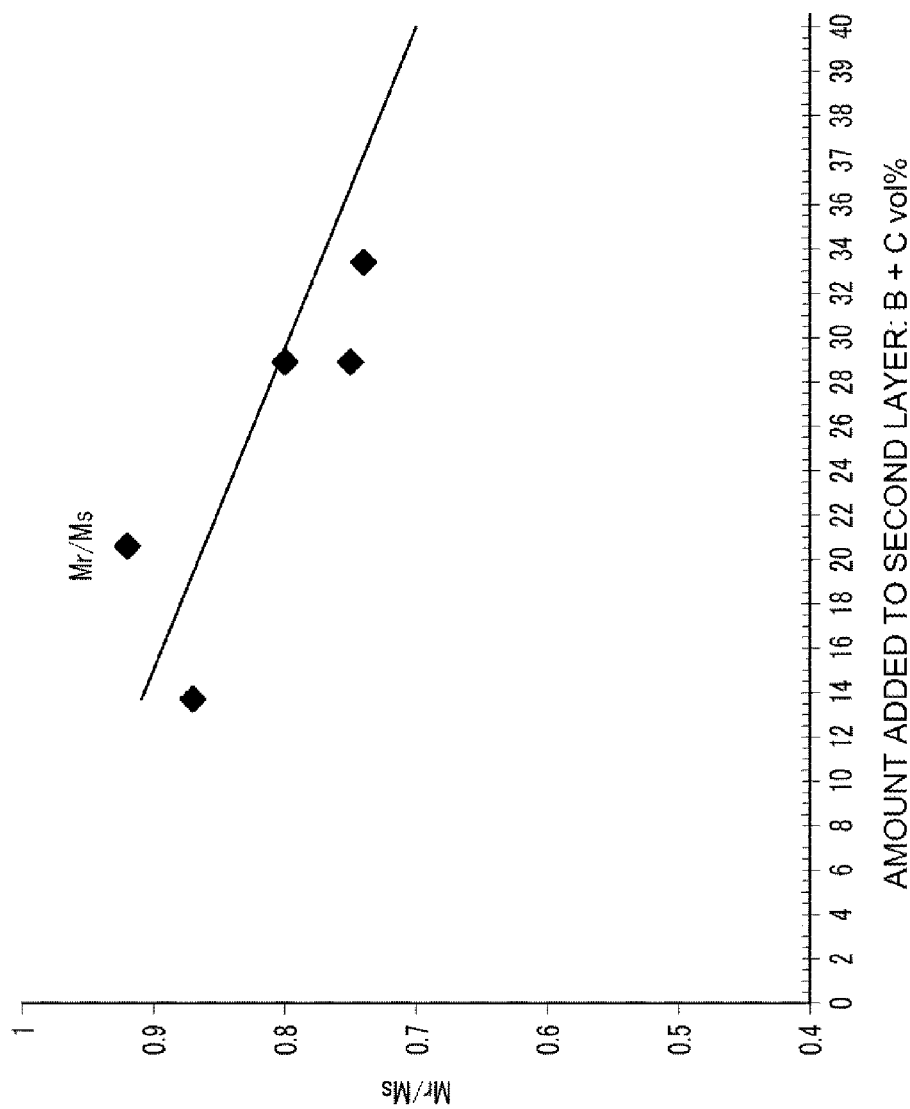
FIG. 9 is a plot of the Mr/Ms value against the total amount of boron (B) and carbon (C) in the second magnetic recording layer (second layer) in Examples 13 to 17.

FIG. 9 shows a plot of the Mr/Ms value versus the total amount of boron (B) and carbon (C) in the second magnetic recording layer (second layer) of Examples 13 to 17.

(B-1) Results for Magnetic Recording Medium Including FePt—B—C/FePt—C(Second Magnetic Recording Layer/First Magnetic Recording Layer)

Comparing Examples 7 to 12 and Comparative Examples 7 and 8, in the comparative examples, since the nonmagnetic material in the ordered alloy-nonmagnetic material combination is only carbon (C), the secondary growth occurred. As a result, the values of Ku and Mr/Ms decreased with respect to those of Examples 7 to 12.

The results obtained in Examples 7 to 12 demonstrate that the ratio (B/C ratio) of boron (B) and carbon (C) in the second magnetic recording layer is preferably equal to or greater than 0.3, more preferably equal to or greater than 0.4 (FIG. 7). The results obtained in Examples 13 to 17 (those results are obtained by investigating the B—C content in the second magnetic recording layer over a range wider than that in Examples 7 to 12) also demonstrate that the B/C ratio is preferably equal to or greater than 0.3, more preferably equal to or greater than 0.4 (FIG. 8).

The results shown in FIG. 9 indicate that the Mr/Ms ratio also tends to decrease with the increase in the total amount of boron (B) and carbon (C) in FePt—B—C. Further, the results obtained Examples 7 to 17 also demonstrate that the content of the nonmagnetic material in the ordered alloy-nonmagnetic material combination is preferably from 20 vol % to 40 vol %, more preferably from 20 vol % to 30 vol %.

In FIG. 5 the results obtained in Example 11 are shown together with those obtained in Examples 1 to 6. As shown in the figure, an excellent magnetic characteristic, same as those in Examples 1 to 6, could be also realized by using the FePt—B—C.

(C) Results Obtained in Example 10 and Comparative Example 9

Figure 10A:
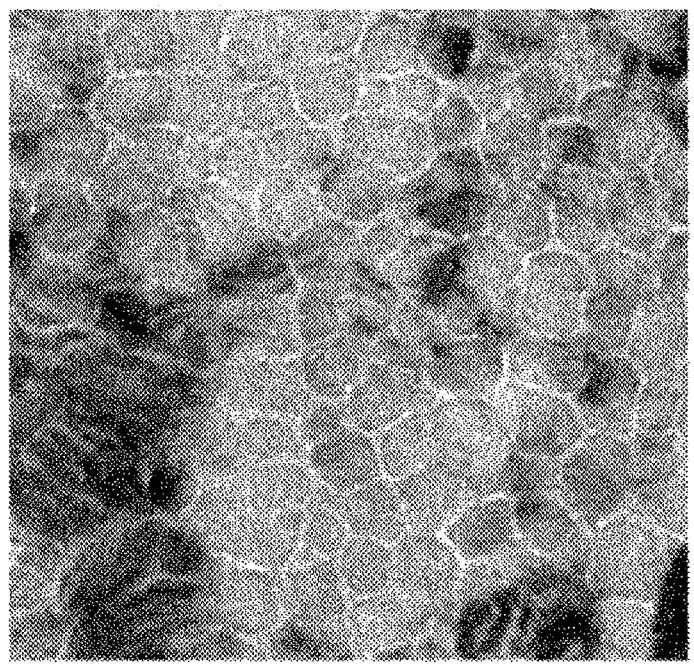
FIG. 10A shows a planar TEM image of the magnetic recording medium of Example 10.
Figure 10B:
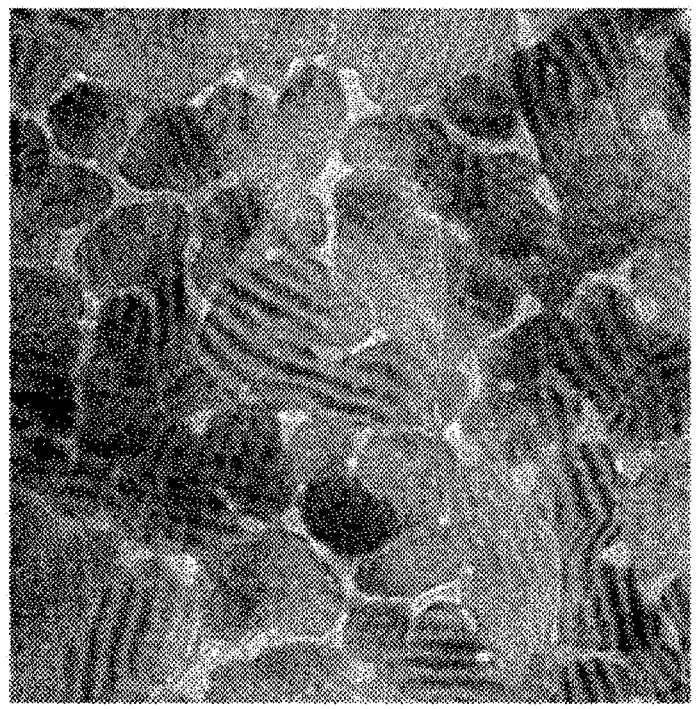
FIG. 10B shows a planar TEM image of the magnetic recording medium of Comparative Example 9.

In order to compare the magnetic recording medium of the present invention with the conventional magnetic recording medium, a planar TEM of the magnetic recording media of Example 10 and Comparative Example 9 was measured with a transmission electron microscope (TEM). The results are shown in FIGS. 10A and 10B. In Example 10 of the present invention (FIG. 10A), the constantly uniform grain formation was obtained despite a comparatively large film thickness of 7.2 nm. Meanwhile, when FePt—SiO$_2$ was formed as the second magnetic recording layer, as in Comparative Example 9 (FIG. 10B), the grain formation was already non-uniform at a film thickness of about 6 nm.

(II) Examples 18 to 20

(i) Examples 18 to 20

In Examples 18 to 20, multilayer configurations including three or more magnetic recording layers were obtained.

A perpendicular magnetic recording medium was fabricated that had a nonmagnetic substrate and a Ta adhesive layer, a Cr underlayer, a MgO seed layer, an ordered alloy (FePt based) magnetic recording layer, and a carbon (C) protective layer provided on the substrate in the order of description. In Examples 18 to 20, FePt—C was used for odd-numbered magnetic recording layers, and FePt—$B_4C$ was used for even-numbered magnetic recording layers (the detailed layer configuration and the thickness of each layer are shown in Table 8).

A chemically strengthened glass substrate (glass substrate N-10, manufactured by HOYA) was prepared as the non-magnetic substrate. The nonmagnetic substrate was introduced in a sputtering apparatus. Film growth was conducted from the Ta adhesive layer to the C protective layer in an inline film growth apparatus, while maintaining the controlled atmosphere. The Ta adhesive layer was grown to a thickness of 5 nm by DC magnetron sputtering in an Ar atmosphere by using a pure Ta target. Then, the Cr underlayer was grown to a thickness of 20 nm by DC magnetron sputtering under the Ar atmosphere by using a pure Cr target.

The substrate was then heated to 300° C., and the seed layer with a thickness of 5 nm was grown by RF sputtering by using a MgO target. The MgO layer, which was the seed layer, was grown at a RF power of 200 W under the Ar atmosphere with a degree of vacuum of 0.1 Pa.

The first magnetic recording layer was then grown. The first magnetic recording layer was a FePt—C layer. Initially, the substrate on which the abovementioned layers were grown was heated to 400° C. and the first magnetic recording layer with the thickness shown in Table 8 was grown by DC magnetron sputtering by using a target including FePt and C that was adjusted to obtain the composition during the growth of FePt (vol %)-C (vol %) which is shown in Table 1. The first magnetic recording layer (FePt—C layer) was grown at a DC power of 100 W under an Ar gas atmosphere with a vacuum degree of 1.0 Pa.

The second magnetic recording layer was then grown. The second magnetic recording layer of the present example was a FePt—$B_4C$ layer. The growth was performed in the following manner. The substrate with the first magnetic recording layer grown thereon in the above-described manner was heated to 400° C. In this state, the second magnetic recording layer was grown to a thickness shown in Table 1 by DC magnetron sputtering by using a target including FePt and boron carbide that was adjusted to obtain the composition during the growth of FePt (vol %)-$B_4C$ (vol %) which is shown in Table 8. The second magnetic recording layer (FePt—$B_4C$ layer) was grown at a DC power of 100 W under an Ar gas atmosphere with a vacuum degree of 1.0 Pa.

A magnetic recording medium having the desired number of layers was formed by repeating the necessary number of times the procedure for forming the first magnetic recording layer and the second magnetic recording layer.

A carbon protective layer with a thickness of 3 nm was then formed by DC magnetron sputtering by using a carbon target under an Ar gas atmosphere, and a magnetic recording medium was obtained.

(ii) Evaluation

The magnetic recording media in the present examples were evaluated by evaluating the magnetic anisotropy constant (Ku). The evaluation method was the same as in Examples 1 to 6.

The coercivity (Hc) and the α value of an M-H hysteresis loop (inclination of the magnetization curve close to the coercivity) were determined in addition to the magnetic anisotropy constant. The evaluation method was the same as in Examples 1 to 6.

The results are shown in Table 8. For reference, Table 8 also shows the results obtained in Examples 1 to 3.

TABLE 8

| Example | Layer configuration of magnetic recording layers[1] | Total film thickness | Ku (erg/cm³) ($10^{-1}$ J/m³) | He (kOe) ([ ] : (× $10^6$ A/m)) | α value of hysteresis loop |
|---|---|---|---|---|---|
| 1 | FePt · 25 vol % $B_4C$ (5 nm)/ FePt · 25 vol % C (2 nm) | 5 | 1.60E+07 | 16.5 [1.3] | 0.8 |
| 2 | FePt · 25 vol % $B_4C$ (5 nm)/ FePt · 25 vol % C (2 nm) | 7 | 1.00E+07 | 11.2 [0.89] | 1.2 |
| 3 | FePt · 25 vol % $B_4C$ (7 nm)/ FePt · 25 vol % C (2 nm) | 9 | 1.20E+07 | 13.1 [1.04] | 1.1 |
| 18 | FePt · 25 vol % C (2 nm)/ FePt · 25 vol % $B_4C$ (3 nm)/ FePt · 25 vol % C (2 nm) | 7 | 1.43E+07 | 15.6 [1.24] | 1.1 |
| 19 | FePt · 25 vol % $B_4C$ (3 nm)/ FePt · 25 vol % C (2 nm)/ FePt · 25 vol % $B_4C$ (3 nm)/ FePt · 25 vol % C (2 nm) | 10 | 1.41E+07 | 15.2 [1.20] | 0.8 |
| 20 | FePt · 25 vol % C (2 nm)/ FePt · 25 vol % $B_4C$ (2 nm)/ FePt · 25 vol % C (2 nm)/ FePt · 25 vol % $B_4C$ (2 nm)/ FePt · 25 vol % C (2 nm) | 10 | 1.43E+07 | 16.0 [1.27] | 1.2 |

[1]In the layer configuration of the magnetic recording layers, FePt · 25 vol % $B_4C$ represents a FePt · $B_4C$ magnetic recording layer including 25 vol % $B_4C$, and FePt · 25 vol % C represents a FePt · C magnetic recording layer including 25 vol % C. The numerical values in the parentheses represent the thickness of each magnetic layer.
[2]The layer configuration of the magnetic recording layers is N-th magnetic layer/ . . . /first magnetic layer (here, N = 2 to 5), the first magnetic layer being close to the substrate.

Figure 11:
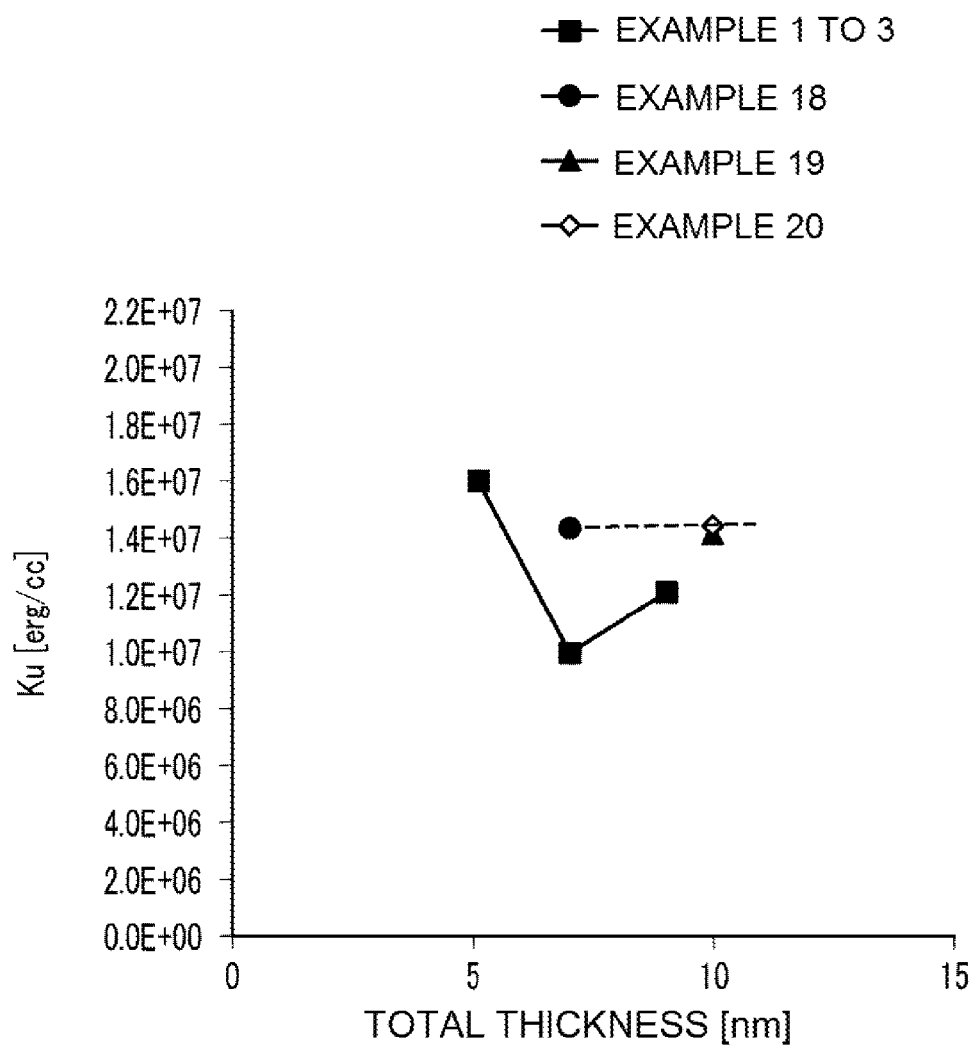
FIG. 11 is a plot of the Ku value against the total thickness of the magnetic recording layers in magnetic recording media of Examples 1 to 3 and Examples 18 to 20.

The abovementioned results are shown in FIG. 11. In FIG. 11, the Ku value is plotted against the total thickness of the magnetic recording layers.

The results clearly indicate that by stacking alternately a plurality of FePt—C layers and FePt—$B_4C$ layers, it is possible to increase further the film thickness while maintaining the Ku, Hc, and α value of hysteresis loop.

Figure 12A:
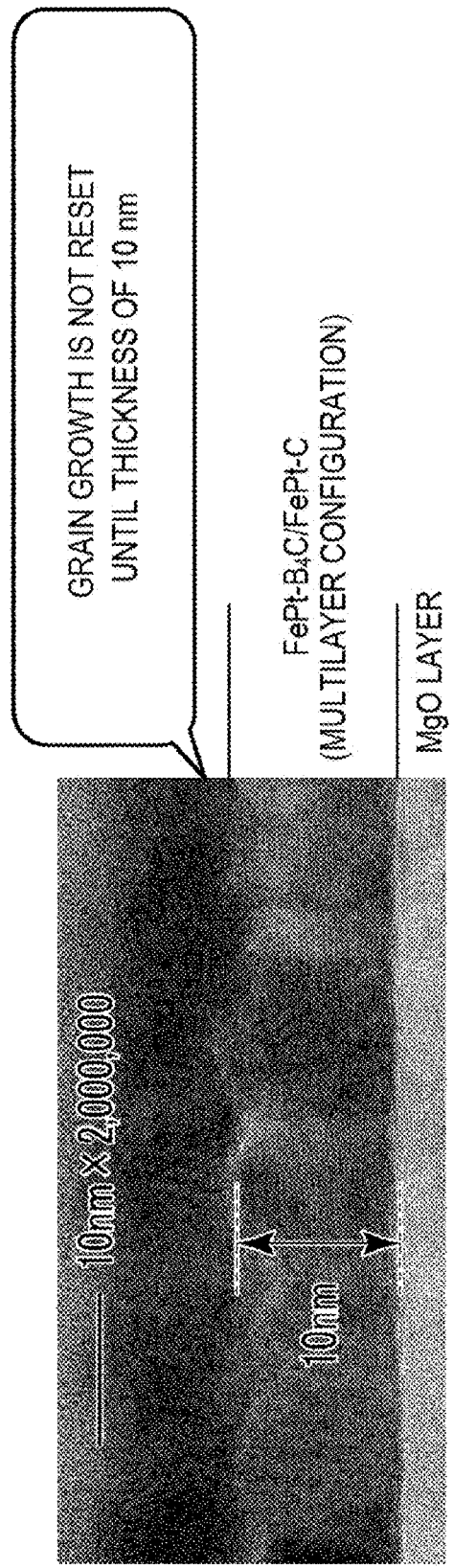
FIG. 12A shows a perpendicular TEM image of the magnetic recording medium of Example 20.
Figure 12B:
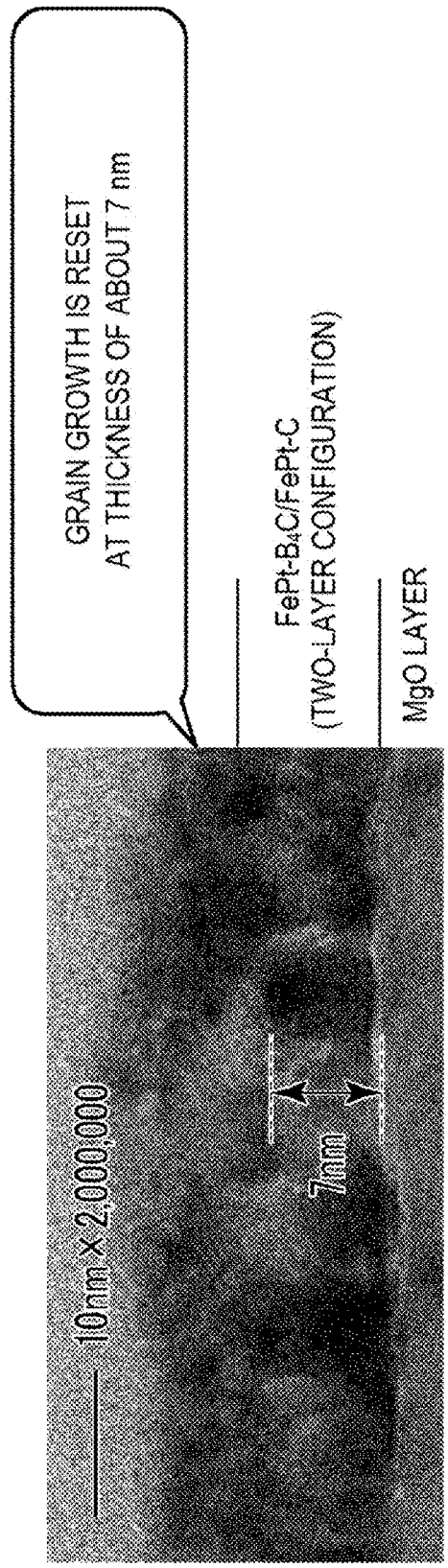
FIG. 12B shows a perpendicular TEM image of the magnetic recording medium of Example 3.

Then, the perpendicular TEM of the magnetic recording medium having the magnetic recording layers of the layered structure of Example 20 and the magnetic recording medium having the magnetic recording layers of the layered structure of Example 3 was measured. The results are shown in FIGS. 12A and 12B. The results clearly demonstrate that in Example 3 with a two-layer structure, the growth of the ordered alloy was inhibited at a film thickness of about 7 nm, but in Example 20 in which the magnetic recording medium had a large number of layers, no such inhibition occurred until the film thickness of about 10 nm.

(III) Conclusion

The comparison of the test results obtained in the examples and comparative examples demonstrates that the total thickness of the magnetic recording layers could be increased, while maintaining a high magnetic anisotropy, in an embodiment of the present invention by using FePt—C as the first magnetic recording layer and providing, as the second magnetic recording layer combined therewith, a magnetic recording layer having a granular structure of the ordered-alloy-including magnetic crystal grains-carbon-containing nonmagnetic material combinations which were used in the abovementioned examples. Further, as another embodiment of the present invention, the total thickness of the magnetic recording layers could be increased, while maintaining a high magnetic anisotropy, by alternately providing a plurality of FePt—C layers and the ordered-alloy-including magnetic crystal grains-carbon-containing nonmagnetic material layers.

INDUSTRIAL APPLICABILITY

The magnetic recording medium in accordance with the present invention can be used in magnetic recording devices including perpendicular magnetic recording media, which are inclusive of energy-assisted (such as thermally-assisted and microwave-assisted) magnetic recording media.

EXPLANATION OF REFERENCE NUMERALS 20 nonmagnetic substrate
40, 210 seed layers
60 magnetic recording layer
62 first magnetic recording layer
64 second magnetic recording layer
80 protective layer
100 magnetic recording medium
200 magnetic crystal grains
230 first magnetic crystal grains of ordered alloy
250 second magnetic crystal grains of ordered alloy
270 nonmagnetic crystal grain boundary
290, 292, 294 axes of easy magnetization
320 precipitation portion of the additive material (nonmagnetic material) to ordered alloy
400 mixing region of magnetic crystal grains (200) and nonmagnetic material (320)

The invention claimed is:

1. A perpendicular magnetic recording medium, comprising:
a nonmagnetic substrate; and
a magnetic recording layer that includes a plurality of layers, including at least a first magnetic recording layer and a second magnetic recording layer, the magnetic recording layer having a thickness equal to or greater than 5 nm,
wherein the first magnetic recording layer has a granular structure including first magnetic crystal grains and first nonmagnetic crystal grain boundaries surrounding the first magnetic crystal grains, the first magnetic crystal grains including an $L1_0$-type ordered alloy containing Fe and Pt, the first nonmagnetic crystal grain boundaries being constituted by carbon, and
wherein the second magnetic recording layer has a granular structure including second magnetic crystal grains and second nonmagnetic crystal grain boundaries surrounding the second magnetic crystal grains, the second magnetic crystal grains including an $L1_0$-type ordered alloy containing Fe and Pt, the second nonmagnetic crystal grain boundaries being constituted by SiC, BC, or SiBC, a content of a material of the second nonmagnetic crystal grain boundaries in the second magnetic recording layer being in a range of 20 vol % to 50 vol %.

2. The perpendicular magnetic recording medium according to claim 1, wherein a thickness of the first magnetic recording layer is equal to or less than 4 nm.

3. The perpendicular magnetic recording medium according to claim 1, wherein the perpendicular magnetic recording medium has a plurality of the first magnetic recording layers or a plurality of the second magnetic recording layers, and the first magnetic recording layers and the second magnetic recording layers are stacked alternately.

4. The perpendicular magnetic recording medium according to claim 1, wherein the first magnetic recording layer has a thickness within a predetermined width so as to prevent a secondary growth of additional magnetic crystal grains on the first magnetic recording layer.

5. A perpendicular magnetic recording medium, comprising:
a nonmagnetic substrate; and
a magnetic recording layer that includes a plurality of layers, including at least a first magnetic recording layer and a second magnetic recording layer, the magnetic recording layer having a thickness equal to or greater than 5 nm,
wherein the first magnetic recording layer has a granular structure that includes first magnetic crystal grains and first nonmagnetic crystal grain boundaries surrounding the first magnetic crystal grains, the first magnetic crystal grains including an $L1_0$-type ordered alloy, the first nonmagnetic crystal grain boundaries being constituted by carbon, and
wherein the second magnetic recording layer has a granular structure that includes second magnetic crystal grains and second nonmagnetic crystal grain boundaries surrounding the second magnetic crystal grains, the second magnetic crystal grains including an $L1_0$-type ordered alloy, a content of a material of the second nonmagnetic crystal grain boundaries in the second magnetic recording layer being in a range of 20 vol % to 50 vol %, the second nonmagnetic crystal grain boundaries being borocarbide (B-carbide) or a silicocarbide (Si-carbide) a carbide.

6. The perpendicular magnetic recording medium according to claim 5, wherein the carbide is boron carbide ($B_4C$) or silicon carbide (SiC).

7. The perpendicular magnetic recording medium according to claim 5, wherein at least one of the $L1_0$-type ordered alloys includes Fe and Pt.

8. The perpendicular magnetic recording medium according to claim 5, wherein a thickness of the first magnetic recording layer is equal to or less than 4 nm.

9. The perpendicular magnetic recording medium according to claim 5, wherein the perpendicular magnetic recording medium has a plurality of the first magnetic recording layers or a plurality of the second magnetic recording layers, and the first magnetic recording layers and the second magnetic recording layers are stacked alternately.

10. The perpendicular magnetic recording medium according to claim 5, wherein the first magnetic recording layer has a thickness within a predetermined width so as to prevent a secondary growth of additional magnetic crystal grains on the first magnetic recording layer.

* * * * *